(12) United States Patent
Ho

(10) Patent No.: US 8,923,207 B2
(45) Date of Patent: Dec. 30, 2014

(54) METHOD FOR INITIALIZING SEQUENCE OF REFERENCE SIGNAL AND BASE STATION USING THE SAME

(71) Applicant: Industrial Technology Research Institute, Hsinchu (TW)

(72) Inventor: Chung-Lien Ho, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 135 days.

(21) Appl. No.: 13/726,226

(22) Filed: Dec. 24, 2012

(65) Prior Publication Data

US 2013/0308555 A1 Nov. 21, 2013

Related U.S. Application Data

(60) Provisional application No. 61/648,093, filed on May 17, 2012.

(51) Int. Cl.
*H04Q 7/00* (2006.01)
*H04Q 7/24* (2006.01)
*H04W 72/04* (2009.01)
*H04L 5/00* (2006.01)

(52) U.S. Cl.
CPC ......... *H04W 72/0446* (2013.01); *H04L 5/0048* (2013.01); *H04L 5/0035* (2013.01)
USPC .......................................... 370/328; 370/338

(58) Field of Classification Search
None
See application file for complete search history.

(56) References Cited

U.S. PATENT DOCUMENTS

| 8,050,220 | B2 | 11/2011 | Lee et al. |
| 2009/0136034 | A1 | 5/2009 | Gaal et al. |
| 2010/0034161 | A1 | 2/2010 | Luo et al. |
| 2010/0172235 | A1* | 7/2010 | Liu et al. ...................... 370/208 |

(Continued)

FOREIGN PATENT DOCUMENTS

| TW | 201018168 | 5/2010 |
| WO | 2010/079924 | 7/2010 |
| WO | 2011/047351 | 4/2011 |

OTHER PUBLICATIONS

Takeda et al., "Investigation of Two-Dimensional Orthogonal Sequence Mapping to Multi-layer Reference Signal for LTE-Advanced Downlink," 2010 IEEE 72nd Vehicular Technology Conference Fall (VTC 2010—Fall), Sep. 6-9, 2010, pp. 1-5.

(Continued)

*Primary Examiner* — Hong Cho
(74) *Attorney, Agent, or Firm* — Jianq Chyun IP Office

(57) ABSTRACT

A method and an apparatus are provided for scrambling sequence initialization for downlink demodulation reference signal (DL DMRS) applied to the multi-user (MU) multi-input multi-output (MU-MIMO) in a coordinated multiple point (CoMP) scenario. The value of virtual slot index in the sequence initialization of the DL DMRS can be dynamically selected from two candidates and tied to the virtual cell ID and/or the physical downlink shared channel (PDSCH) scrambling ID. The two candidate values can be configured by a user equipment (UE) specific semi-statistical higher layer signaling if a subframe shifting is considered for enhanced inter-cell interference cancellation (eICIC) in HeNets. Possible values of virtual slot index used for generating the DL DMRS sequence initialization of the cell can then be derived so that access procedure information, which may include synchronization signal, physical broadcast channel, paging message, can be reliably received at the remote radio header (RRH) or pico cell.

37 Claims, 26 Drawing Sheets

(56) References Cited

U.S. PATENT DOCUMENTS

| | | | |
|---|---|---|---|
| 2010/0272040 A1* | 10/2010 | Nam et al. | 370/329 |
| 2010/0322178 A1 | 12/2010 | Li et al. | |
| 2011/0077038 A1 | 3/2011 | Montojo et al. | |
| 2012/0250642 A1* | 10/2012 | Qu et al. | 370/329 |
| 2013/0215845 A1* | 8/2013 | Lee et al. | 370/329 |

OTHER PUBLICATIONS

Thomas et al, "CSI Reference Signal Designs for Enabling Closed-Loop MIMO Feedback," 2010 IEEE 72nd Vehicular Technology Conference Fall (VTC 2010—Fall), Sep. 6-9, 2010, pp. 1-5.

Hu et al., "Optimal Pilot Sequence Design for Channel Estimation in MIMO OFDM Systems," IEEE Communications Letters 10(1), Jan. 2006, pp. 1-3.

Hoeher et al., "Two-Dimensional Pilot-Symbol-Aided Channel Estimation by Wiener Filtering," 1997 IEEE International Conference on Acoustics, Speech, and Signal Processing, vol. 3, Apr. 21-24, 1997, pp. 1845-1848.

Jeon et al, "Two-Dimensional MMSE Channel Estimation for OFDM Systems with Transmitter Diversity," IEEE VTS 54th Vehicular Technology Conference, vol. 3, Oct. 7-11, 2001, pp. 1682-1685.

"R1-120035: CSI-RS sequence," 3GPP TSG RAN WG1 meeting #68, Feb. 6-10, 2012, Dresden, Germany, pp. 1-5.

"R1-120984: Remaining details of CSI-RS configuration," 3GPP TSG RAN WG1 meeting #68bis, Mar. 26-30, 2012, Jeju, Korea, pp. 1-4.

"R1-121629: Dynamic Switching of DMRS Scrambling for Downlink CoMP," 3GPP TSG RAN WG1 #68bis, Mar. 26-30, 2012, Jeju, Korea, pp. 1-3.

"3rd Generation Partnership Project; Technical Specification Group Radio Access Network; Evolved Universal Terrestrial Radio Access (E-UTRA); Physical Channels and Modulation" 3GPP TS 36.211 (Release 10), V10.4.0, Dec. 2011, 3GPP Organizational Partners, pp. 1-101.

"3rd Generation Partnership Project; Technical Specification Group Radio Access Network; Coordinated multi-point operation for LTE physical layer aspects" 3GPP TR 36.819 (Release 11), V11.1.0, Dec. 2011, 3GPP Organizational Partners, pp. 1-69.

"3rd Generation Partnership Project; Technical Specification Group Radio Access Network; Evolved Universal Terrestrial Radio Access (E-UTRA); Physical Channels and Modulation" 3GPP TS 36.211 (Release 8), V8.9.0, Dec. 2009, 3GPP Organizational Partners, pp. 1-83.

"3rd Generation Partnership Project; Technical Specification Group Radio Access Network; Evolved Universal Terrestrial Radio Access (E-UTRA); Physical Channels and Modulation" 3GPP TS 36.211 (Release 9), V9.1.0, Mar. 2010, 3GPP Organizational Partners, pp. 1-85.

"3rd Generation Partnership Project; Technical Specification Group Radio Access Network; Evolved Universal Terrestrial Radio Access (E-UTRA); Multiplexing and channel coding" 3GPP TS 36.212 (Release 10), V10.5.0, Mar. 2012, 3GPP Organizational Partners, pp. 1-79.

"Office Action of Taiwan Counterpart Application", issued on Mar. 24, 2014, p. 1-p. 5.

* cited by examiner

| $n_{SCID}$ | $x(n)=x(n_{SCID})$ | $n_s$ | Antenna port, D |
|---|---|---|---|
| 0 | $x(0)=N_{ID}^{serving}$ | $n_s=n_s^{serving}$ | 7 |
|   |   |   | 8 |
| 1 | $x(1)=N_{ID}^{common}$ | $n_s=n_s^{common}$ | 7 |
|   |   |   | 8 |

FIG. 10A

| $n_{SCID}$ | x(n) | $n_s$ | Antennaport,D |
|---|---|---|---|
| 0 | $x(0)=N_{ID}^{serving}$ | $n_s=n_s^{serving}$ | 7 |
| | $x(1)=N_{ID}^{common}$ | $n_s=n_s^{common}$ | 8 |
| | $x(0)=N_{ID}^{serving}$ | $n_s=n_s^{serving}$ | 7 |
| | $x(1)=N_{ID}^{common}$ | $n_s=n_s^{common}$ | 8 |
| 1 | $x(0)=N_{ID}^{serving}$ | $n_s=n_s^{serving}$ | 7 |
| | $x(1)=N_{ID}^{common}$ | $n_s=n_s^{common}$ | 8 |
| | $x(0)=N_{ID}^{serving}$ | $n_s=n_s^{serving}$ | 7 |
| | $x(1)=N_{ID}^{common}$ | $n_s=n_s^{common}$ | 8 |

| Value | One Codeword: Codeword 0 enabled, Codeword 1 disabled Message | Value | Two Codeword: Codeword 0 enabled, Codeword 1 enabled Message |
|---|---|---|---|
| 0 | 1 layer, port 7, $n_s=n_s(0), X=x(0), n_{SCID}=0$ | 0 | 2 layer, port 7-8, $n_s=n_s(0), X=x(0), n_{SCID}=0$ |
| 1 | 1 layer, port 7, $n_s=n_s(1), X=x(1), n_{SCID}=0$ | 1 | 2 layer, port 7-8, $n_s=n_s(1), X=x(1), n_{SCID}=1$ |
| 2 | 1 layer, port 8, $n_s=n_s(0), X=x(0), n_{SCID}=0$ | 2 | 3 layer, port 7-9, $n_s=n_s(0), X=x(0), n_{SCID}=0$ |
| 3 | 1 layer, port 8, $n_s=n_s(1), X=x(1), n_{SCID}=1$ | 3 | 4 layer, port 7-10, $n_s=n_s(0), X=x(0), n_{SCID}=0$ |
| 4 | 2 layer, port 7-8, $n_s=n_s(0), X=x(0), n_{SCID}=0$ | 4 | 5 layer, port 7-11, $n_s=n_s(0), X=x(0), n_{SCID}=0$ |
| 5 | 3 layer, port 7-9, $n_s=n_s(0), X=x(0), n_{SCID}=0$ | 5 | 6 layer, port 7-12, $n_s=n_s(0), X=x(0), n_{SCID}=0$ |
| 6 | 4 layer, port 7-10, $n_s=n_s(0), X=x(0), n_{SCID}=0$ | 6 | 7 layer, port 7-13, $n_s=n_s(0), X=x(0), n_{SCID}=0$ |
| 7 | 1 layer, port 9, $n_s=n_s(1), X=x(1), n_{SCID}=1$ | 7 | 8 layer, port 7-14, $n_s=n_s(0), X=x(0), n_{SCID}=0$ |

401

METHOD FOR INITIALIZING SEQUENCE OF REFERENCE SIGNAL AND BASE STATION USING THE SAME

CROSS REFERENCE TO RELATED APPLICATION

This application claims the priority benefit of U.S. provisional application Ser. No. 61/648,093, filed on May 17, 2012. The entirety of the above-mentioned patent application is hereby incorporated by reference herein and made a part of this specification.

BACKGROUND

1. Technical Field

The present disclosure generally relates to a method of generating an initializing value for a sequence of reference signals and a base station using the same.

2. Related Art

In the advent of a next release of a $3^{rd}$ Generation Partnership Project (3GPP) specification in which Coordinated Multi-Point transmission/reception (CoMP) will be further supported, numerous challenges are still yet to be solved as well as new requirements are being posed to accommodate new additions to the specifications. These challenges may include inference between and within transmission points (TP), compatibility between release versions, increase demands of signal overheads and system capacities. In particular, various proposals have been made to improve the design of the channel state information reference signal (CSI-RS) and the download modulation reference signal (DMRS).

The channel state information reference signals (CSI-RS) are specifically intended to be used by a user equipment (UE) to acquire channel-state information (CSI) in the case when demodulation reference signals are used for channel estimation and downlink data demodulation. FIG. 1 illustrates, for instance, release 10 CSI-RS patterns with different CSI-RS configurations for 2, 4, and 8 antenna ports when normal cycle prefixes (NPC) are used. The numbering indices on the painted squares stand for the CSI-RS configuration indices which indicate the locations of CSI-RS signals on resource elements for each different CSI-RS configuration, and 20, 10, and 5 CS-RS configurations exist for 2, 4, and 8 CSI-RS ports respectively. Also please note that antenna ports 15 and 16 are used when there are 2 CSI-RS ports; antenna ports 15-18 are used in case of 4 CSI-RS ports; antenna ports 15-22 are used for 8 CSI-RS ports.

More specifically, the CSI-RS for each antenna pair could be allocated to the same resource elements but separated by using an orthogonal cover code (OCC) over two contiguous OFDM symbols. In other words, the division of the CSI-RS is accomplished by using the technique of code division multiplexing (CDM) expanded within 2 OFDM symbols in time domain and is called the CDM-T scheme. FIG. 2 shows an example of the CDM-T scheme for 8 antenna ports using the CSI-RS configuration #0 for time domain duplex (TDD) with 10 MHz bandwidth in case of NCP. The indices on the painted squares are the CSI-RS antenna port indices. Please note that the CSI-RS for the antenna pair 15 and 16 are allocated to the same resource elements. Likewise, the antenna pair 17 and 18, the antenna pair 19 and 20, and the antenna pair 21 and 22 also are allocated to the same resource elements.

An example of the mapping of the CSI-RS reference to specific resource elements could be seen according to Section 6.10.5.2 of the 3GPP technical specification TS 36.211 version 10.4.0 Release 10 which is hereby incorporated by reference. In this example, table 1 and table 2 together defines the allocation of CSI-RS resource as table 1 illustrates the mapping from each release 10 CSI-RS configuration to the specific resource element (k', l') for NCP where k' is the subcarrier index and l' is the OFDM symbol index, and table 2 illustrates the release 10 CSI-RS sub-frame configurations.

TABLE 1

Mapping from Rel-10 CSI-RS configuration to the RE (k', l') for NCP

| | | Number of CSI reference signals configured | | | | | |
|---|---|---|---|---|---|---|---|
| | CSI | 2 | | 4 | | 8 | |
| | Configuration | (k', l') | $n_s$ mod 2 | (k', l') | $n_s$ mod 2 | (k', l') | $n_s$ mod 2 |
| Frame structure type 1 and 2 (FDD/TDD) | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only (TDD) | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |

TABLE 1-continued

Mapping from Rel-10 CSI-RS configuration to the RE (k', l') for NCP

| CSI Configuration | Number of CSI reference signals configured | | | | | |
|---|---|---|---|---|---|---|
| | 2 | | 4 | | 8 | |
| | (k', l') | $n_s$ mod 2 | (k', l') | $n_s$ mod 2 | (k', l') | $n_s$ mod 2 |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

TABLE 2

Rel-10 CSI-RS subframe configuration

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ - 5 |
| 15-34 | 20 | $I_{CSI-RS}$ - 15 |
| 35-74 | 40 | $I_{CSI-RS}$ - 35 |
| 75-154 | 80 | $I_{CSI-RS}$ - 75 |

Section 6.10.5.1 shows an example of a CSI-RS sequence generation which could be expressed as follows:

$$r_{l,n_s}(m) = \frac{1}{\sqrt{2}}(1 - 2 \cdot c(2m)) + j \cdot \frac{1}{\sqrt{2}}(1 - 2 \cdot c(2m+1)) \quad (1)$$

$$m = 0, 1, \ldots, N_{RB}^{max,DL} - 1$$

where $n_s$ is the slot index within a radio frame and l is OFDM symbol index within the slot. $N_{RB}^{max,DL}$ is the maximum number of resource blocks (RBs) for DL, and c(i) is a pseudo-random sequence and is initialized at the start of each OFDM symbol according to:

$$c_{init} = 2^{10} \cdot (7 \cdot (n_s+1)+l+1) \cdot (2 \cdot X+1) + 2 \cdot X + N_{CP} \quad (2)$$

where $N_{CP}$=1 for NCP and 0 for extended CP (ECP) and X is $N_{ID}^{cell}$, which is the cell ID of the serving cell or transmit point (TP) and can be any one of the values from 0 to 503. An example of c(i) could be the length-31 Gold pseudo-random sequence as defined in section 7.2 of TS 26.211 v10.4.0. It should be noted that, the orthogonality of CSI-RS between cells/TPs could be achieved by using the same sequence initialization (i.e. $n_s$, l, X and $N_{CP}$) but different ports through cover codes. This means that the parameters $n_s$, l, X and $N_{CP}$ would be required to produce the same initialization value for the CSI-RS between different cells/TPS in order to maintain orthogonalities. For example, port 15 and port 16 are orthogonal if they use the same sequence initialization. However, if different sequence initializations but same port of CSI-RS are used for the cells/TPs, the orthogonality of CSI-RS between cells/TPs will no longer hold.

The consequence of the need for orthogonalities is that extra reference signal overhead is required in the case of CoMP. For example, CSI-RS of 3GPP release 10 assumes a nesting property which means that a smaller number of CSI-RS ports would be a sub-set of a larger number of CSI-RS ports. Take FIG. 1 as an example, a 4-port CSI-RS would be a sub-set of an 8-port CSI-RS so that one 8-port CSI-RS resource can be shared between two cells/TPs as each of which can use one of the sub-sets of the 8-port CSI-RS. In other words, the two 4-port CSI-RS resources within the same 8-port CSI-RS resource, called as an intra-CSI-RS resource, can be used for the two cells/TPs as depicted in FIG. 3. It can be seen from FIG. 3 that two 4-port CSI-RS resources, configuration #2 and configuration #7, within the same 8-port CSI-RS resource can be respectively used for the Rel-11 or advanced version by UEs in cell #1 and cell #2 for joint transmission (JT) in CoMP with separate cell ID scenarios such as CoMP Scenario 3.

If cell #1 and cell #2 were in the CoMP scenario, according to the Rel-10 CSI-RS definition, the two 4-port CSI-RS resources within the same 8-port CSI-RS port would be required to apply the same scrambling sequence initialization generated based on for example cell #1. Under this circumstance, the 4-port CSI-RS resource using configuration #7 will no longer be used for the Rel-10 UEs in cell #2 due to mismatch of scrambling sequence initialization. In other words, the antenna ports for configuration #2 and #7 could no longer be assigned to the same resource elements using OCC since by doing so equation (2) would produce a different sequence initialization as the cell #2 uses a different set of parameters. Therefore, an additional 4-port CSI-RS resource with a corresponding muting scrambled based on cell ID #2, configured as configuration #4 for example, is needed for the Rel-10 UEs in cell #2 so that consequently an additional CSI-RS resource overhead which would have the same sequence initialization as cell #1 would be needed.

Based on FIG. 1, Table 1 and Table 2, it can be seen that the number of CSI-RS resources which could be configured within a subframe without collision is not by any means limitless. FIG. 4 shows that the increases of CSI-RS overhead would exacerbate in the case of 8-port CSI-RS resource for 2 TPs in the JT-CoMP scenario. Hence, the available CSI-RS resources would at some point be insufficient as the number of CoMP cooperating sets grows to a large number. To order to solve the aforementioned problem, one simple solution is to independently configure a virtual cell ID X in the sequence initialization per CSI-RI port or Per TP so that the CSI-RS can be individually used per CSI-RS port (or per TPs).

Besides the orthogonalities of the CSI-RS, the orthogonalities of the downlink (DL) demodulation reference signal (DMRS) must also be considered. A DMRS is a UE specific reference signal used for channel estimation and demodulation of the downlink data. FIG. 5 shows an example of a DL DMRS pattern in the case of NCP for the release 9 and release 10 of the 3GPP specification which specifies that antenna ports 7 and 8 are used for 2 DMRS ports, antenna ports 7-10 are used for 4 DMRS ports, and antenna ports 7-14 are used for 8 DMRS ports. Similar to a CSI-RS, CDM-T scheme may also be applied to DL DMRS. For rank 1~4 transmission, OCC with length of 2 is used for DMRS; for rank larger than 4 transmission, OCC with length of 4 is used for DMRS. More specifically, for rank 1~4 transmission, each antenna pair of the DMRS ports are allocated at the same resource elements but separated by using the OCC over the contiguous 2 OFDM symbols as illustrated by FIG. 6. Furthermore, each pair of DMRS ports may be separated from another pair by using the frequency division multiplexing (FDM) scheme. Please note that the indices on the painted squares stand for the DMRS antenna port indices.

A DL DMRS sequence can be expressed by equation (3) as below:

$$r(m) = \frac{1}{\sqrt{2}}(1 - 2 \cdot c(2m)) + j \cdot \frac{1}{\sqrt{2}}(1 - 2 \cdot c(2m + 1)) \quad (3)$$

$$m = \begin{cases} 0, 1, \ldots, 12N_{RB}^{max,DL} - 1 & NCP \\ 0, 1, \ldots, 16N_{RB}^{max,DL} - 1 & ECP \end{cases}$$

where $N_{RB}^{max, DL}$ is the maximum number of resource blocks (RBs) for DL. For equation (3), c(i) could be a pseudo-random sequence according to section 7.2 of TS 36.211 v10.4.10 and is initialized at the beginning of each subframe using $$c_{init} = ((n_s/2)+1) \cdot (2 \cdot X+1) \cdot 2^{16} + n_{SCID} \quad (4)$$

where $n_s$ is the slot index within a radio frame, $X=N_{ID}^{cell}$ is the cell ID of the serving cell/TP and $n_{SCID}=0$ (the scrambling ID) unless specified otherwise. For a physical downlink shared channel (PDSCH) transmission on port 7 or 8, $n_{SCID}$ for downlink control information (DCI) format 2B is indicated by the scrambling ID field and for 2C is recited below based on the specification according to 3GPP TS 36.212 release 10 version 10.5.0 which is hereby incorporated by reference.

TABLE 3

Antenna port(s), scrambling ID and number of layers indication for Rel-10 DCI format 2C.

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

The first 4 rows at the left hand side and the first 2 rows at the right hand side of Table 3 show that the DMRS is applied to the multi-user (MU) MIMO (MU-MIMO) and the rest is for the single-user (SU) MIMO (SU-MIMO) which can be illustrated in FIGS. 7(a)-7(d) where FIG. 7(a) illustrates SU-MIMO transmitting two layer streams of data containing DMRS through antenna ports 7 and 8, FIG. 7(b) illustrates co-scheduled MU-MIMO with each UE having one layer stream and the same scrambling ID, FIG. 7(c) illustrates 2 UEs co-scheduled with each having a different $n_{SID}$ and two layers of data, and FIG. 7(d) illustrates co-scheduled 4 UE MU-MIMO with each having a single layer of data stream and two of the UEs may have the same scrambling ID. It should be noted that different scrambling ID or $n_{SCID}$ would result in different initiation values of scrambling sequences.

Since orthogonality means that at least two different DMRS with the same scrambling sequence through different antenna ports, and quasi-orthogonalities means that two different DMRS would have different scrambling sequences, it can be seen from the left hand side of table 3 that DMRS between value 0 and 2 would be orthogonal from each other, and DMRS between values 1 and 3 would be orthogonal. DMRS between values 0 and 1 and between 2 and 3 would be quasi-orthogonal. As for the right hand side, DMRS between different layers of data stream within the same UE would be orthogonal but quasi-orthogonal between different UEs.

Therefore, in order to control orthogonalities of DMRS signals, the parameters $n_{SCID}$, X, and $n_s$ must be carefully chosen to satisfy new requirements for further releases. Requirements for a future release has been suggested as (1) interference randomization between TPs, (2) orthogonal MU pairing within each TP, (3) backward compatible orthogonal MU pairing between releases, (4) orthogonal MU pairing across TP border, and (5) feasibility for Joint Transmission (JT) and dynamic point selection (DPS). At this point, it has been agreed that DL DMRS sequence would be further enhanced for a future release version in which the value of X can be dynamically chosen from $\{x(0), x(1), \ldots, x(N-1)\}$, where N is an integer and $1 \leq N \leq 503$, and x(n) ($0 \leq n < N$) are configured by UE specific radio resource (RCC) signaling. Currently there have been two solutions to dynamically select the parameter X.

The first solution is that X is dynamically selected from x(0) and x(1), and $n_{SCID}$ in DCI is re-used for dynamic selections of x(0) and x(1) according to equation (5):

$$X = \begin{cases} x(0) & n_{SCID} = 0 \\ x(1) & n_{SCID} = 1 \end{cases} \quad (5)$$

According to equation (5), X is dynamically selected and is tied to $n_{SCID}$. Solution 1 is summarized according to table 4, where $N_{ID}^{serving}$ is the ID number of the serving TP, and $N_{ID}^{common}$ could be the ID number of the macro cell or an additional virtual ID. Solution 1 thus can support two dynamic DL DMRS sequences per TP configured for UEs.

TABLE 4

| $n_{SCID}$ | $x(n) = x(n_{SCID})$ | Antenna port, v |
|---|---|---|
| 0 | $x(0) = N_{ID}^{serving}$ | 7 |
|  |  | 8 |
| 1 | $x(1) = N_{ID}^{common}$ | 7 |
|  |  | 8 |

The second solution is that X is dynamically selected from x(0) and x(1) using an additional bits in DCI. Solution 2 thus supports 4 dynamic DL DMRS sequences configured for UE with two bits supporting four combinations. Solution 2 is summarized by table 5 below:

TABLE 5

| $n_{SCID}$ | x(n) | Antenna port, v |
|---|---|---|
| 0 | $x(0) = N_{ID}^{serving}$ | 7 |
|  |  | 8 |
|  | $x(1) = N_{ID}^{common}$ | 7 |
|  |  | 8 |

TABLE 5-continued

| $n_{SCID}$ | x(n) | Antenna port, v |
|---|---|---|
| 1 | $x(0) = N_{ID}^{serving}$ | 7 |
| | | 8 |
| | $x(1) = N_{ID}^{common}$ | 7 |
| | | 8 |

Solution 1 is currently considered the solution since it has less reference signal overhead and less impact on standardization.

FIG. 8A-8E illustrates the impact of Solution 1 mentioned above on CoMP scenario 3. Requirement (1) requires that interferences be randomized between TPs, and requirement (2) requires orthogonal pairing within each TP. In order to achieve requirement (1), co-schedule UEs within different TPs must be configured with different DL DMRS scrambling sequence initialization values so as to be quasi-orthogonal between TPs as illustrated by FIG. 8A. This implies that different values of X or different values of $n_{SCID}$ should be configured from one TP to another. In order to achieve requirement (2), same values of $n_{SCID}$ should be configured within each TPs.

Requirement (3) requires orthogonal MU pairing between Rel-10 EUs and Rel-11 UEs. To achieve requirement (3), co-scheduled UEs are configured with same DL DMRS scrambling sequence initialization value which meaning that the same values of $n_{SCID}$ and X should be configured among the co-scheduled UEs as illustrated by FIG. 8B. Requirement (4) requires orthogonal MU pairing across TP border. To achieve requirement 4, co-scheduled UEs are configured with same DL DMRS scrambling sequence initialization value which means that the same value of $n_{SCID}$ and X should be configured for the co-scheduled UEs as illustrated in 8C.

Require (5) requires feasibility for JT and DPS. To achieve JT for Requirement 5, the co-scheduled UEs are needed to be configured with same DL DMRS scrambling sequence initialization value which means that the same value of $n_{SCID}$ and X should be configured for the co-scheduled UEs as illustrated in FIG. 8D. To achieve DPS for Requirement 5, the UE is configured with different DL DMRS scrambling sequence initialization values for different TPs which means that different values of X or different values of $n_{SCID}$ should be configured for the UE for different TPs as illustrated in FIG. 8E.

It should be noted that as far as the enhancement for sequence initialization is concerned thus far, the virtual ID X has received the most attention. However, the slot number $n_s$ has not been taken into consideration. Under CoMP scenarios when the cooperating cells/TPs are not synchronous, differences in the slot number $n_s$ among each cell/TP would have an adverse impact on the sequence initialization for both the CSI-RS and DL DMRS, and therefore, a design of sequence initialization using the slot number $n_s$ is needed.

SUMMARY OF THE DISCLOSURE

Accordingly, the present disclosure is generally relates to a method of generating an initializing value for a sequence of reference signals and a base station using the same.

The present disclosure directs to a method for initializing a scrambling sequence of a reference signal, for use by a base station to transmit subframes of data, and the method includes the steps of calculating an initializing value according to at least a slot index of a radio frame for each subframe of data, generating a pseudo-random sequence according to the initializing value, generating the scrambling sequence of the reference signal based on the pseudo-random sequence, and transmitting subframes of data comprising the scrambling sequence of the reference signal.

The present disclosure directs to a base station including at least a transmitter, a receiver, and a processing circuit, wherein the processing circuit is configured through the transmitter and the receiver to execute functions including calculating an initializing value according to at least a slot index of a radio frame for each subframe of data, generating a pseudo-random sequence according to the initializing value, generating the scrambling sequence of the reference signal based on the pseudo-random sequence, and transmitting subframes of data comprising the scrambling sequence of the reference signal.

In order to make the aforementioned features and advantages of the present invention comprehensible, preferred embodiments accompanied with figures are described in detail below. It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 10A illustrates the enhancements in generating the sequence initialization of the DL DMRS with respect to the $n_{SCID}$, x(n) and $n_s$ for Solution 1 as indicated in Table 4.

FIG. 10B summarizes the enhancements in generating the sequence initialization of the DL DMRS with respect to the $n_{SCID}$, x(n) and $n_s$ for Solution 2 as indicated in Table 5.

FIG. 13 illustrates a modification of Table 3 for the enhancement of MU-MIMO and CoMP in accordance with one of the exemplary embodiments of the present disclosure.

DETAILED DESCRIPTION OF DISCLOSED EMBODIMENTS

Figure 1:
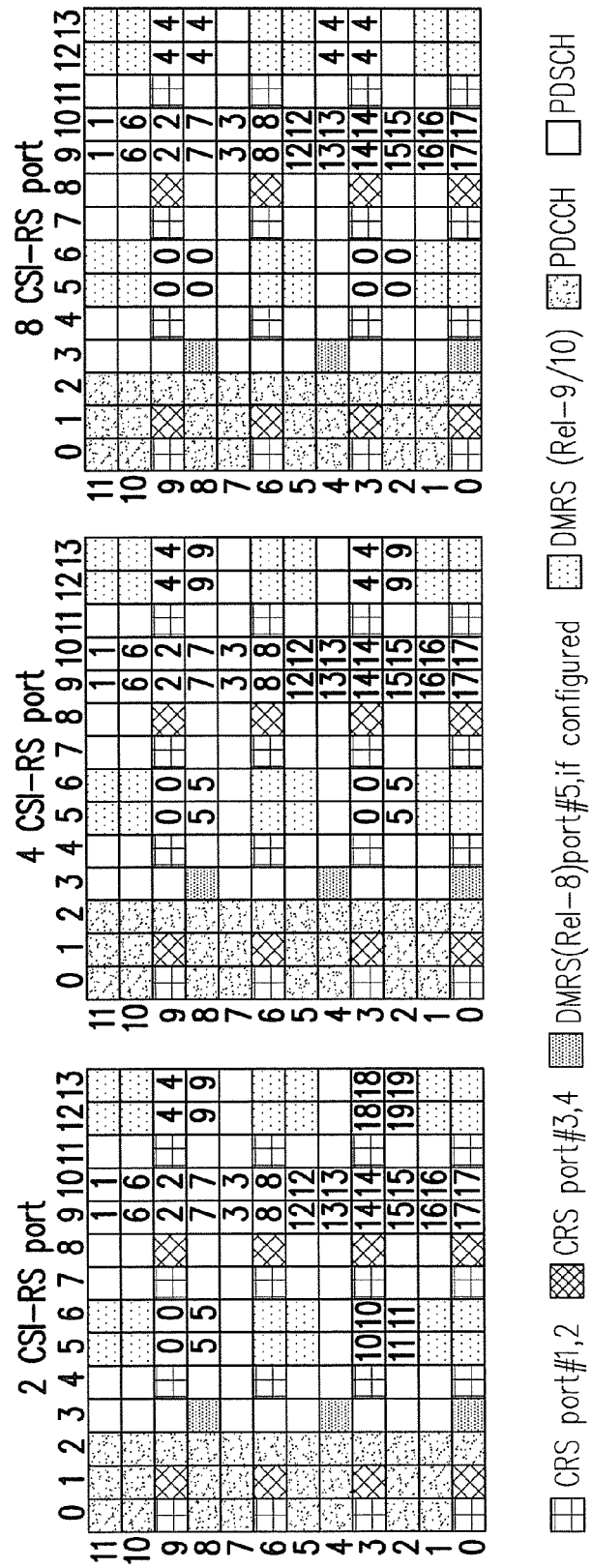
FIG. 1 illustrates Rel-10 CSI-RS patterns with different CSI-RS configurations for 2, 4, and 8 antenna ports in the case of normal cycle prefixes (NCP).
Figure 2:
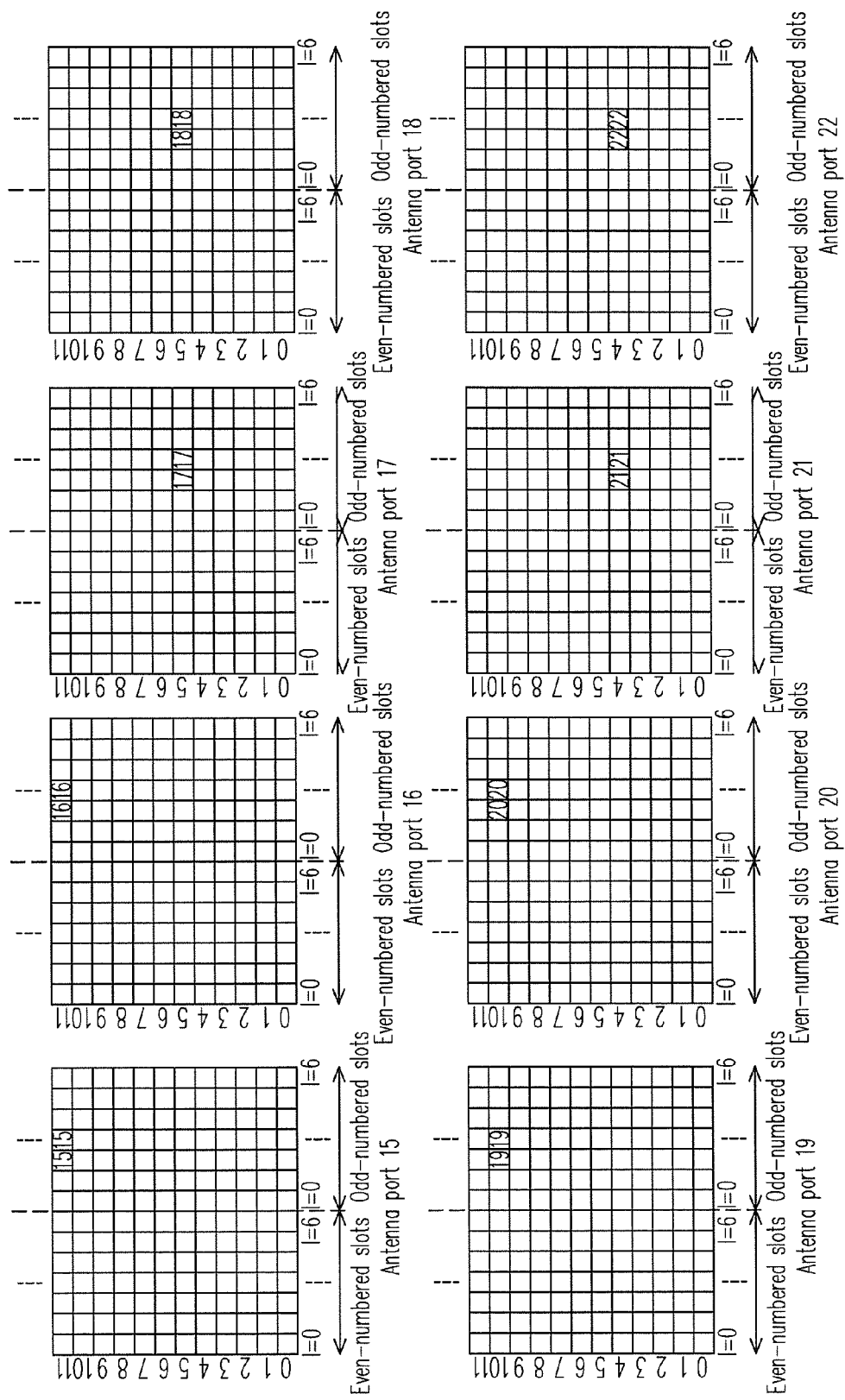
FIG. 2 shows an example of the CDM-T scheme for 8 antenna ports using the CSI-RS configuration #0 for TDD 10 MHz in case of NCP.
Figure 3:
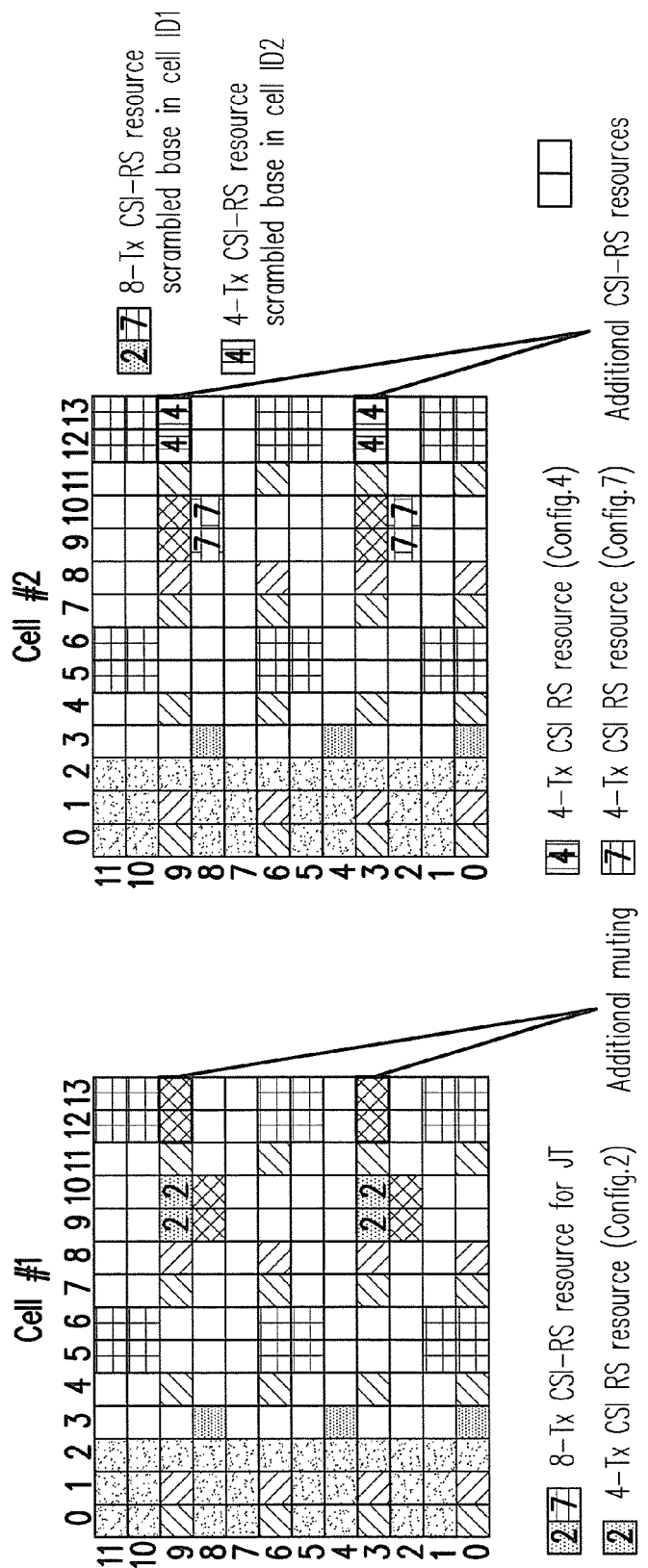
FIG. 3 illustrates the overhead issue for release 10 CSI-RS in JT-CoMP.
Figure 4:
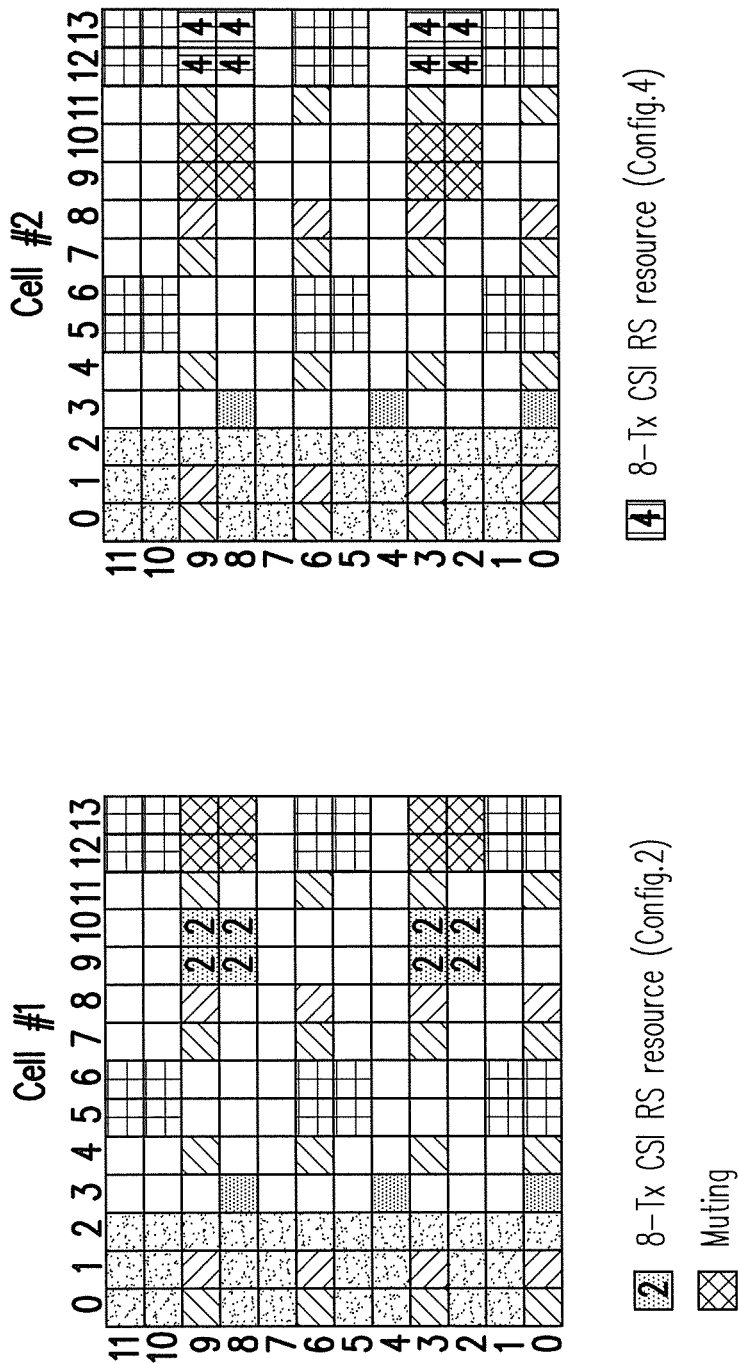
FIG. 4 illustrates an example of the capacity issue for release 10 CSI-RS in JT-CoMP.
Figure 5:
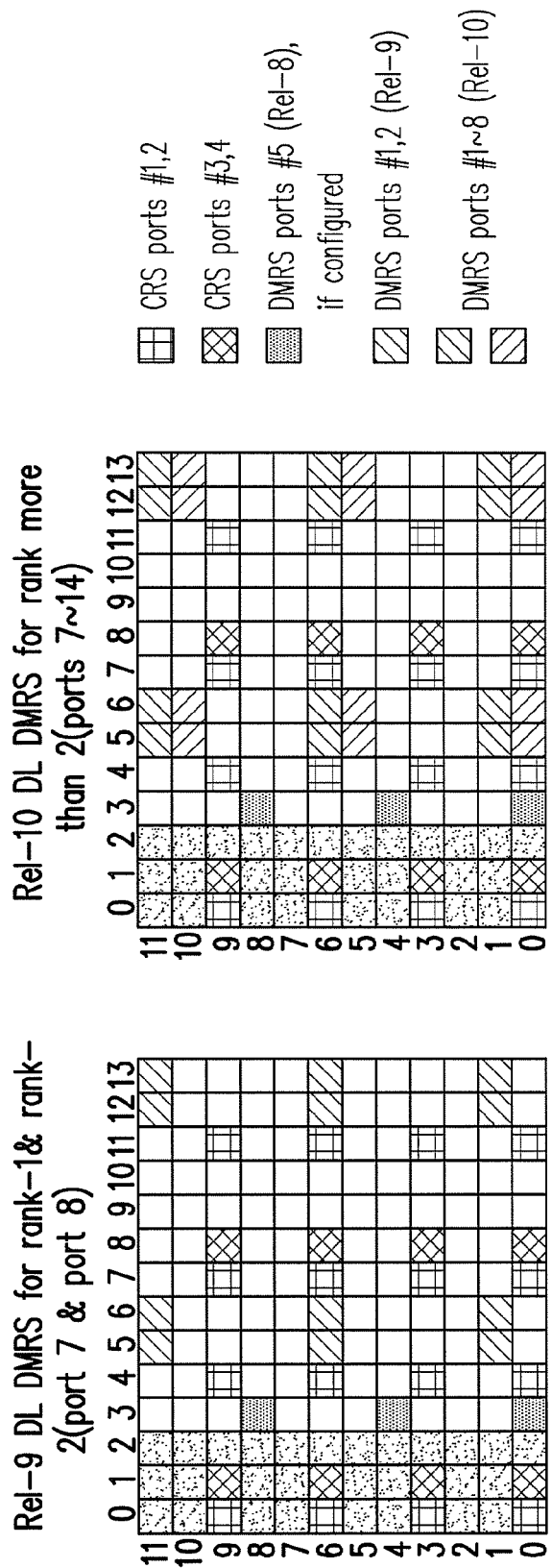
FIG. 5 illustrates an example of a DL DMRS pattern in the case of NCP for the release 9 and release 10 of the 3GPP specification.
Figure 6:
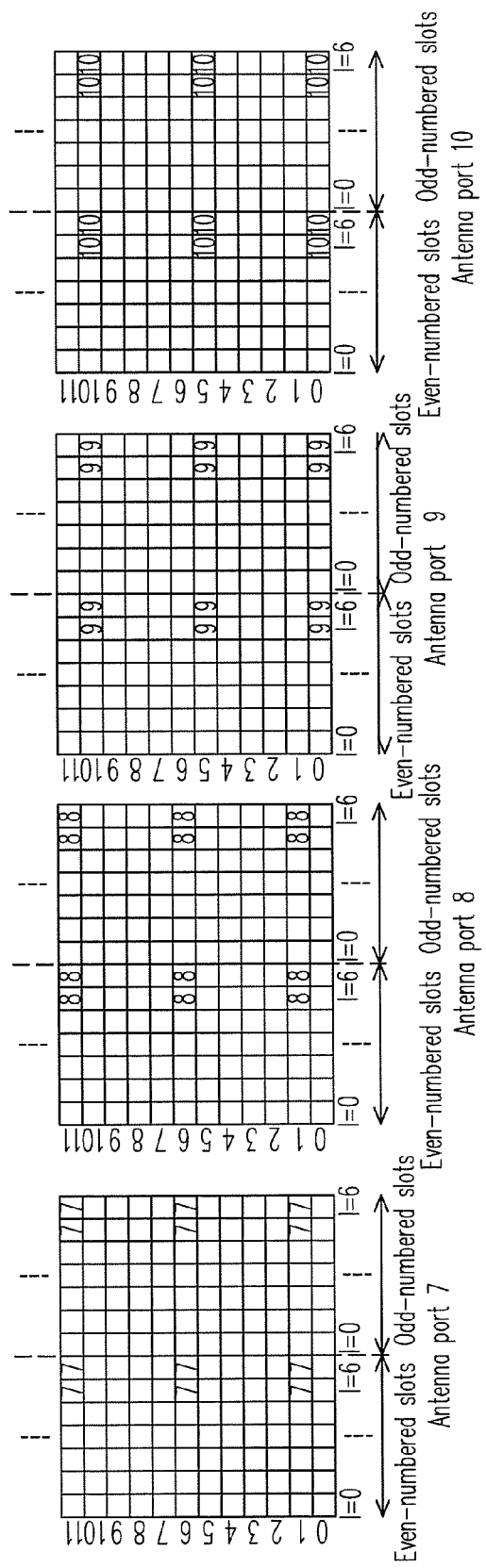
FIG. 6 illustrates the use of FDM and CDM-T scheme for 4-port release 10 DMRS in case of NCP.
Figure 7:
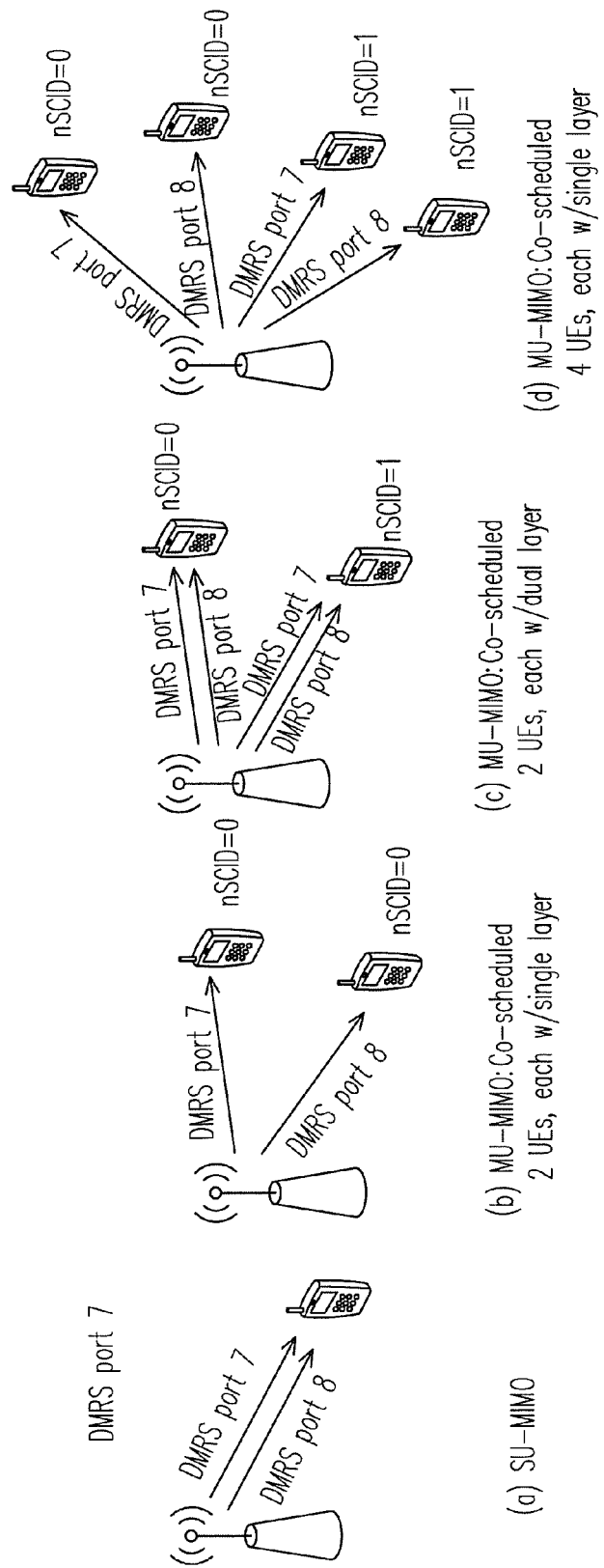
FIG. 7(a)-7(d) illustrates release 10 DL DMRS for SU-MIMO and MU-MIMO.
Figure 8A:
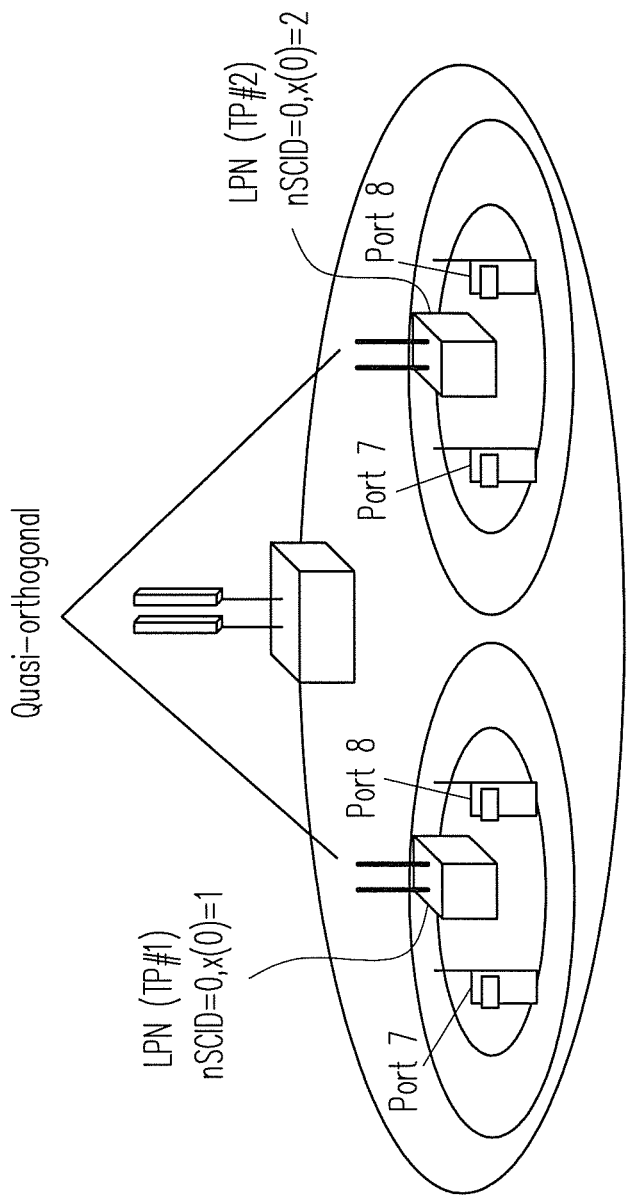
FIG. 8A-8E illustrates various requirements for future DMRS enhancements.
Figure 8B:
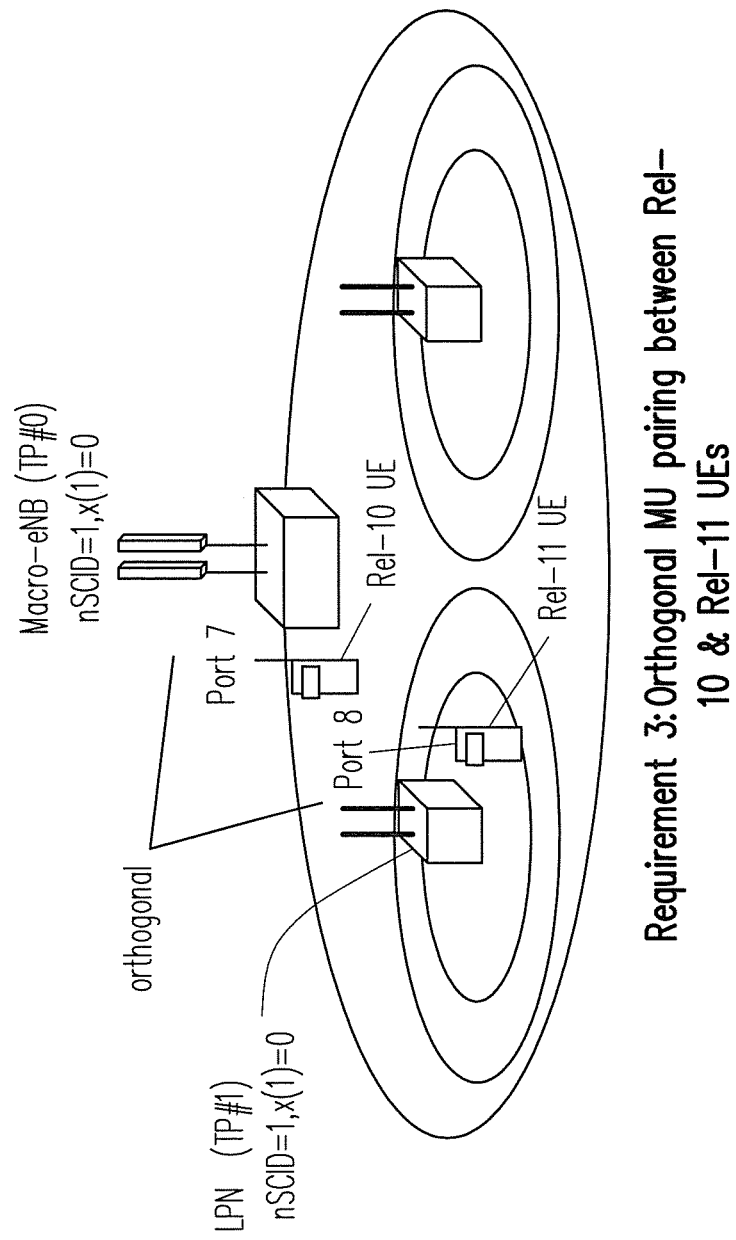
Figure 8C:
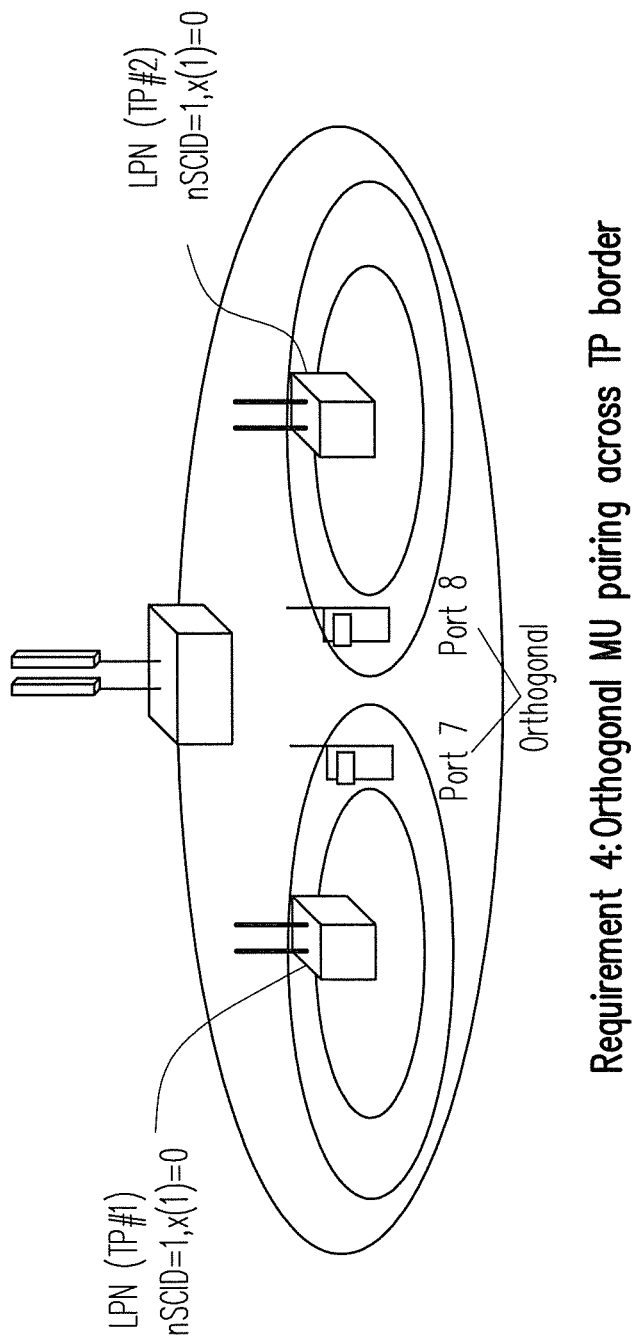
Figure 8D:
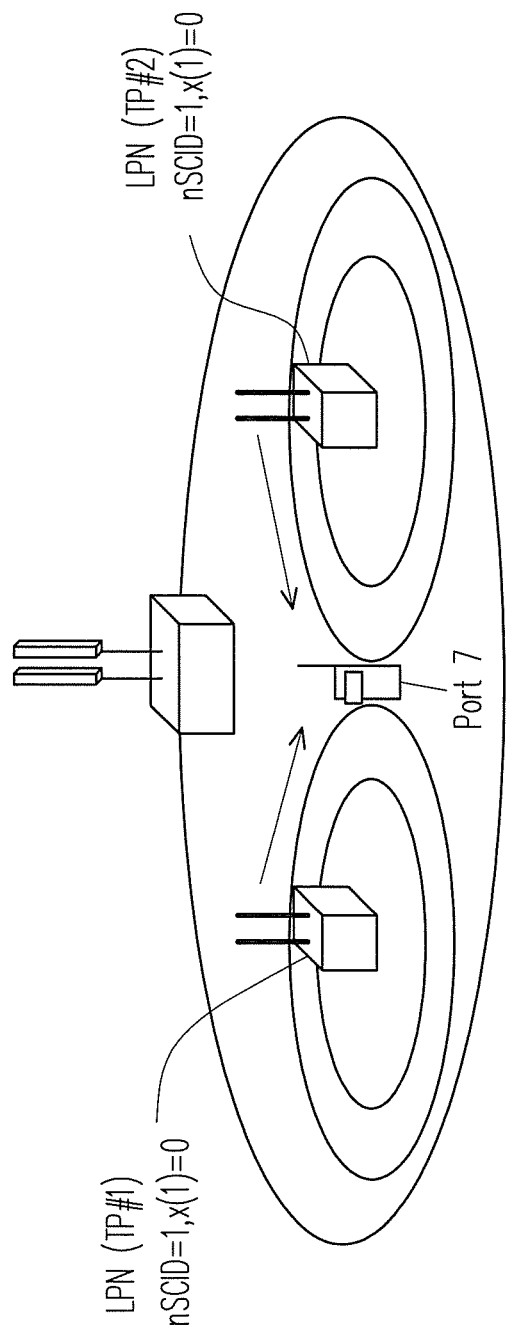
Figure 8E:
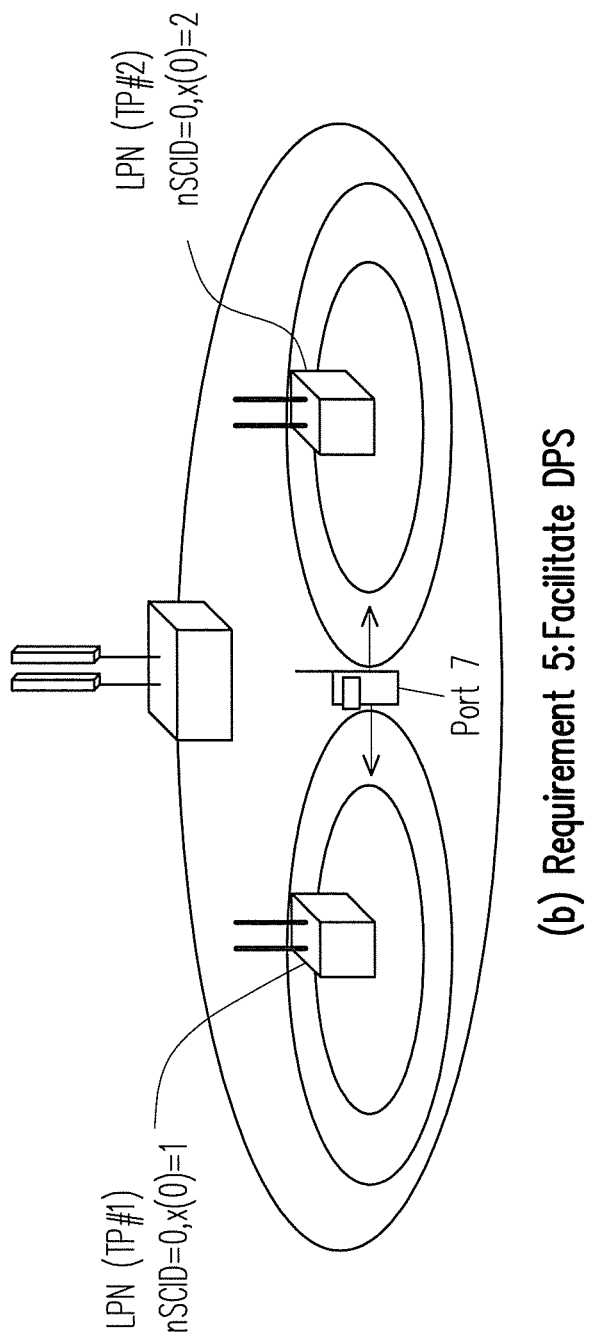

As described above, the improvement over sequence initialization of the Rel-10 CSI-RS and DL DMRS has not taken the slot number $n_s$ into account. When the cooperating cells/TPs for CoMP are not synchronous, that is, the slot number $n_s$ in each cell/TP is different, the sequence initialization for both the CSI-RS and DL DMRS would subsequently be different. According to the current enhancement of sequence initialization of CSI-RS, there is no need to inform an $n_s$ to UE if the multiple CSI-RSs in a subframe have the same $n_s$. But however, the $n_s$ information is needed if a CSI-RS transmitted by a neighbor cell/TP has a shifted slot or subframe relative to the serving cell.

Under a scenario such as release 10 CoMP scenario 3 of JT-CoMP operation in which the same scrambling sequence initialization will be used for the two cooperating cells/TPs with separate cell IDs, suppose that there could be two 4-port CSI-RS resources within the same CSI-RS resource are applied to the UEs in the two cells/TPs. Under this assumption, if the slot number $n_s$ is different between the cells/TPs, then there would be a mismatch among CSI-RS sequences for the Rel-10 UEs in cell/TP #2 because $n_{s,1}$, the slot number of the TP#1, would be used for CSI-RS sequence initialization in cell/TP #2, and also one additional CSI-RS (and also the muting) resource would be needed for cell/TP #2.

Thus, it has been suggested that independent scrambling initialization per CSI-RS port or per TP should be supported. This would mean that $n_s$ should be independently configured per CSI-RS port or per TP. However, for DL DMRS, this would mean that the orthogonality of the DL DMRS will no longer be upheld if the slot number $n_s$ is independently configured per TP as $n_s$ is different between the cooperating cells/TPs for the reason that the same sequence initialization for the DL DMRS should be configured for all the cooperating cells/TPs to satisfy the requirements (3), (4) and (5) based on the disclosure from the background section. Therefore, the slot number $n_s$ should be carefully determined by the eNB and informed to the UEs when the scrambling sequence initialization is generated for both the CSI-RS and DL DMRS in order to save the DL signaling overhead.

In this disclosure, a method of generating the scrambling sequence initialization for the 3GPP DL RSs applied to the heterogeneous networks and CoMP system is disclosed. For sharing the DL signalings, initialization of scrambling sequence of DL DMRS is suggested to be jointly determined with that of CSI-RS. More specifically, when a particular time offset at the serving cell with respect to the other cells is considered, the value of slot index in the sequence initialization of DL DMRS can be dynamically selected from two candidates and tied to the cell ID so that the conflict between the generation of the sequence initialization of CSI-RS and the sequence initialization of DL DMRS can be avoided as the two candidate values can be configured by the UE-specific semi-statistical signaling. The possible values of slot index used for generating the sequence initialization of the serving cell can then be derived according to the physical allocation of paging message, synchronization signals or physical broadcast channel. On the other hand, to enhance the MU-MIMO performance in CoMP system, a simple modification for supporting at most 3 DL DMRS ports for current 3GPP Rel-10 specification without standard impacts is also proposed when the maximum size of the measurement set is 3.

Specific embodiments are to be proposed as follows. It should be noted that the following examples serves to elucidate the principle behind this disclosure, but this disclosure should not be limited to specific embodiments.

Figure 9A:
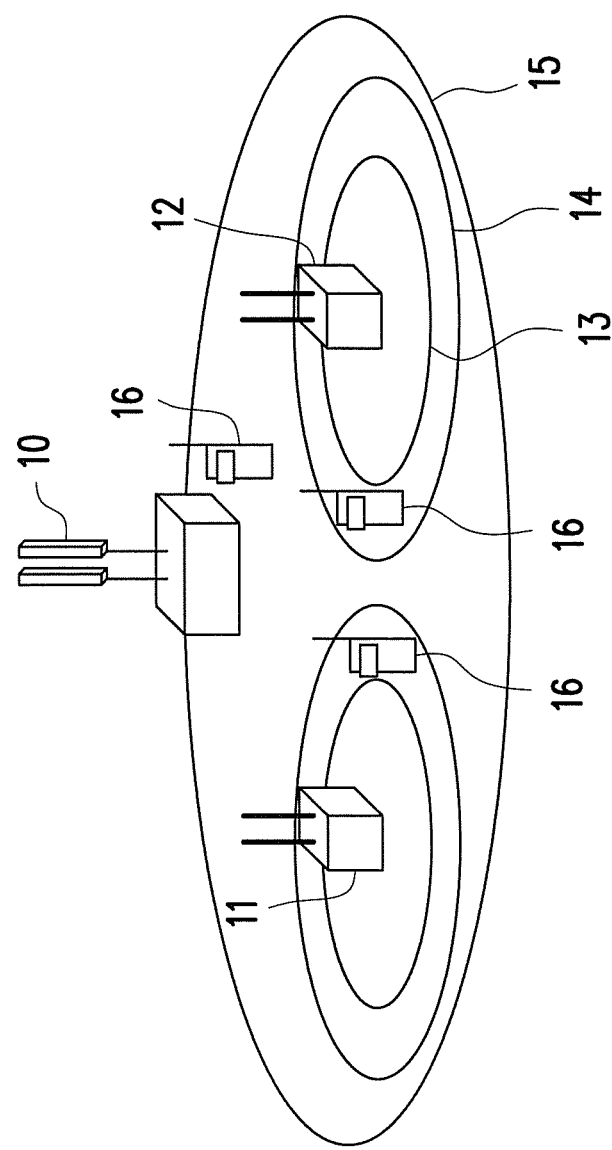
FIG. 9A illustrates an example of CoMP scenario 3 in accordance with one of the exemplary embodiments of the present disclosure.

FIG. 9A illustrates an example of a CoMP scenario 3 in accordance with one of the exemplary embodiments of the present disclosure. In FIG. 9A, an macro eNB 10 serves cooperatively with a lower power node or remote radio header (LPN/RRH) 11 as TP#1 and another LPN/RRH 12 as TP#2 to provide services to UEs 16 under the coverage area 15 provided by the eNB 10. The eNB 10 could be thought of as a macro base station, and the LPN/RRH 11 or 12 could be thought of as a pico base station or just a radio header. A LPN/RRH may contain an inner coverage area 13 and an outer coverage area 14. When a UE steps outsider the inner coverage area 13 into the outer coverage area 14, handover measurements could be triggered.

Figure 9B:
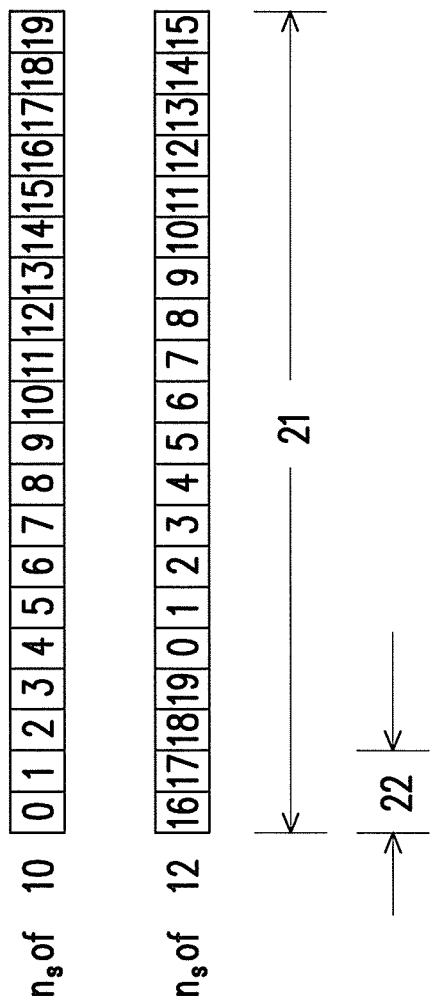
FIG. 9B illustrates slot number shifting in accordance with one of the exemplary embodiments of the present disclosure.

FIG. 9B illustrates slot number shifting in accordance with one of the exemplary embodiments of the present disclosure. If a full radio frame 21 is defined as having a predetermined period, each radio frame 21 may have a certain number of subframes, such as 10 subframes per radio frame. A subframe 22 could contain two slots, and thus a full radio frame 21 would contain 20 slots numbered from 0 to 19. If the first row of FIG. 9B is the frame of the eNB 10, then the second row could be the frame of the LPN 12 relative to the eNB 10. In this example, it can be seen that the frame of LPN is shifted four slots relative to the eNB 10. Since the signal power of an eNB 10 could overwhelm a pico cell such as TP#1 11 or TP#2 12, a pico cell could be designed such that its frame does not align with the eNB so that important system information would not get collision. However, if the miss alignments of the frames could lead to the loss of orthogonality or RF power fading if the slot offset is not synchronized properly.

Figure 9C:
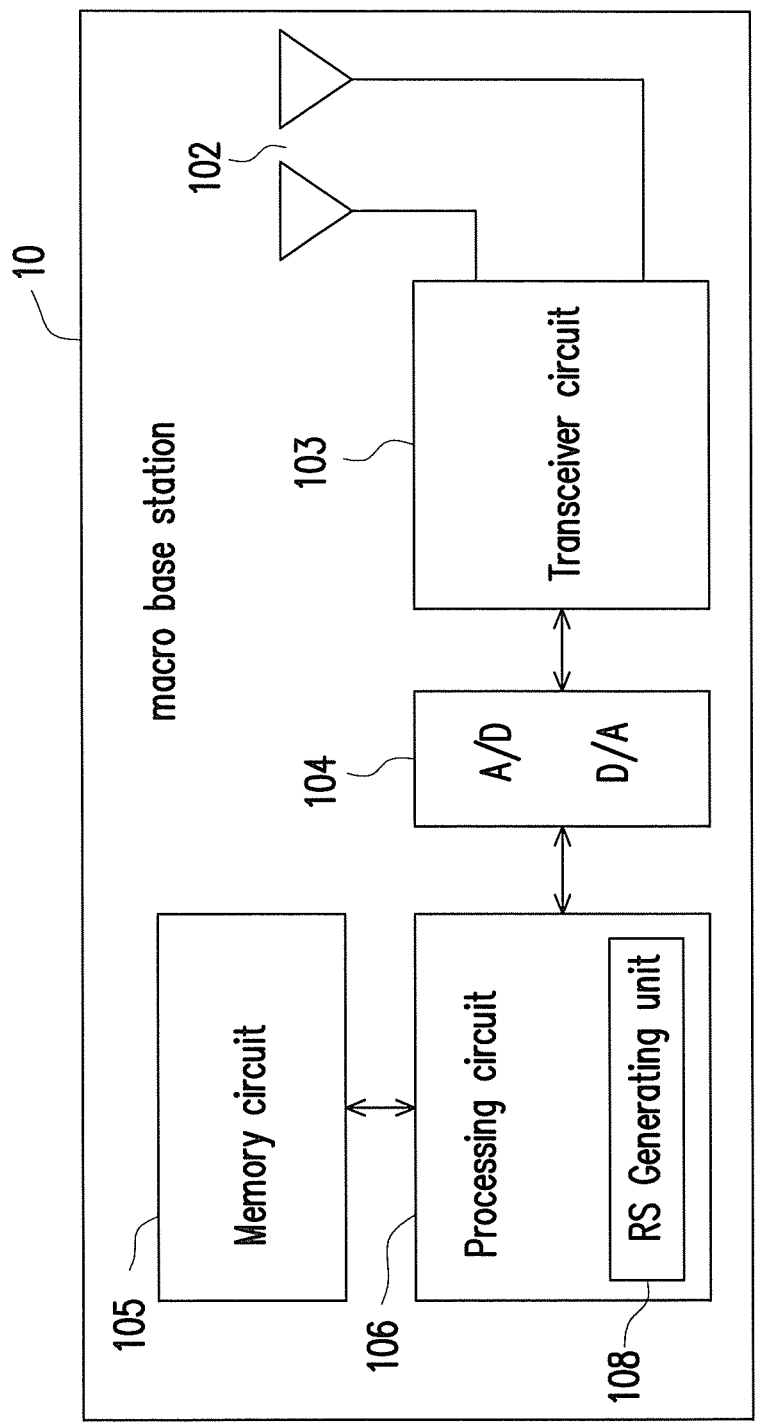
FIG. 9C illustrates a macro base station in accordance with one of the exemplary embodiments of the present disclosure.

FIG. 9C illustrates a macro base station in accordance with one of the exemplary embodiments of the present disclosure. Each eNB 10 may contain at least but not limited to a transceiver circuit 103, an analog-to-digital (A/D)/digital-to-analog (D/A) converter 104, a processing circuit 106, a memory circuit 107, and at least one antenna unit 102. The transceiver circuit 103 includes at least one power amplifier and may transmits downlink signals and receives uplink signals wirelessly through the at least one antenna unit 102. The transceiver circuit 103 may also perform operations such as low noise amplifying, impedance matching, frequency mixing, up or down frequency conversion, filtering, amplifying, and so like. The analog-to-digital (A/D)/digital-to-analog (D/C) converter (104) is configured to convert from an analog signal format to a digital signal format during uplink signal processing and digital signal format to analog signal format during downlink signal processing.

The processing circuit 106 is configured to process digital signals and includes a RS generating unit 108 to perform tasks such as generating various reference signals, such as cell-specific reference signals, MBSFN, DM-RS, CSI-RS, and so forth. Also, the processing circuit 106 may include a memory circuit 105 to store programming codes, codebook configurations, buffered data, or network configurations assigned by the processing circuit 106. The functions of the processing circuit 106 may be implemented using programmable units such as a micro-processor, a micro-controller, a DSP chips, FPGA, and etc. . . . The functions of the processing circuit 106 may also be implemented with separate electronic devices or ICS. It should be noted that the reference signal generating unit 108 may be implemented with either hardware or software.

Figure 9D:
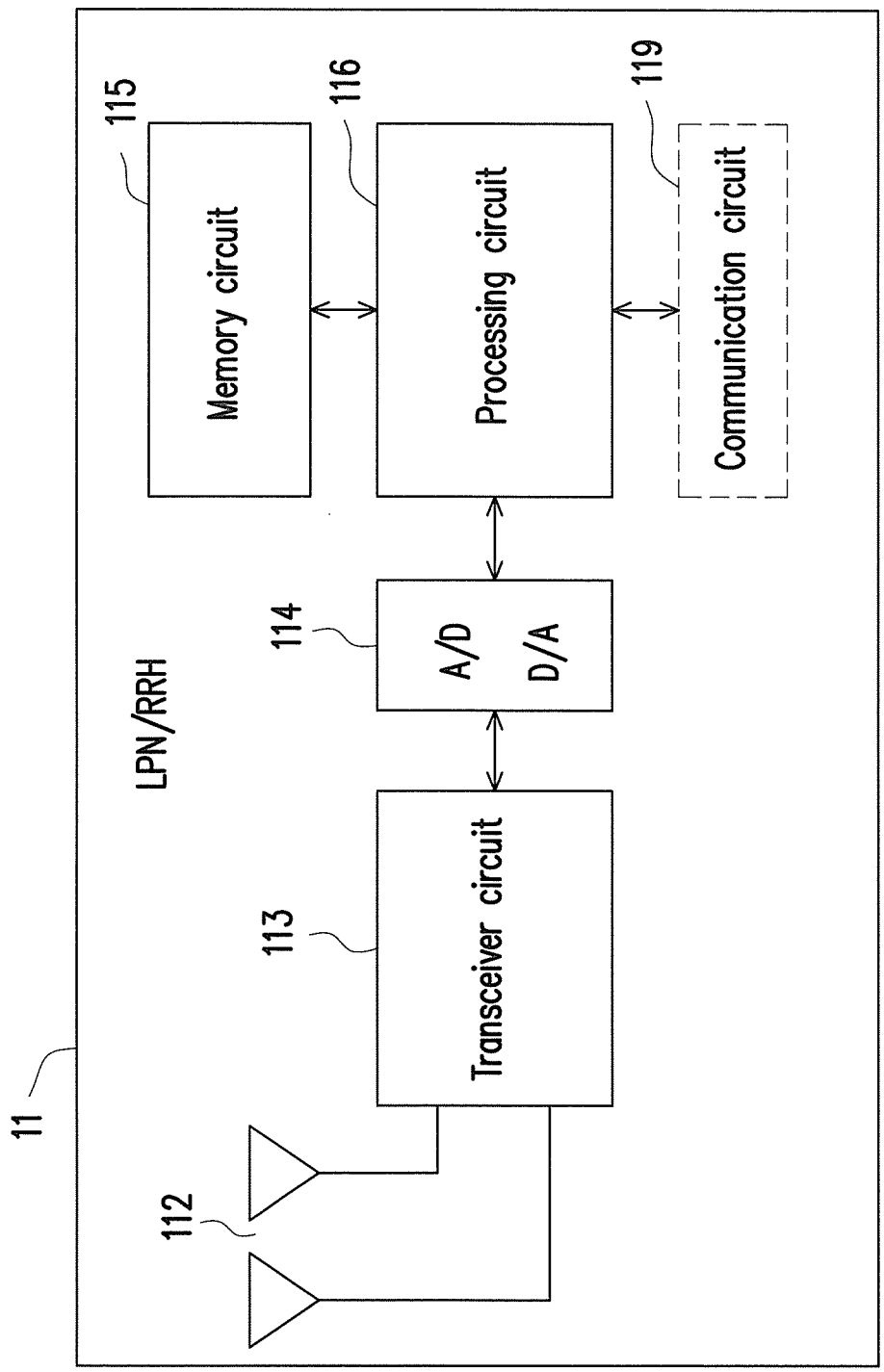
FIG. 9D illustrates a pico base station in accordance with one of the exemplary embodiments of the present disclosure.

FIG. 9D illustrates a LPN/RRH in accordance with one of the exemplary embodiments of the present disclosure. Each LPN/RRH such as 11 or 12 of FIG. 9A may contain at least but not limited to a transceiver circuit 113, an analog-to-digital (A/D)/digital-to-analog (D/A) converter 114, a processing circuit 116, a memory circuit 117, and one or more antenna units 112. The memory circuit 117 may include a memory unit 115 which may store programming code, buffer data, and network configurations.

Functionally, the LPN/RRH 11 or 12 could be thought of as a pico cell base station. The transceiver circuit 113 may include a front end low noise amplifier which maintains a low signal to noise ratio for the system, and then the RF signal may be converted to IF or baseband for further amplification and waveform shaping before converting into digital signals. The pico cell base station 11 or 12 may further include a communication circuit 119 which provides wired access or fiber optical links to users.

There could be two methods to solve the un-synchronous problem for the enhancement of sequence initialization of DL DMRS such as the circumstance of CoMP Scenario 3. It is proposed that the DL DMRS scrambling sequence be initialized according to:

$$c_{init} = ((n_s/2)+1) \cdot (2 \cdot X1) \cdot 2^{16} + n_{SCID} \quad (4)$$

where $n_s$ is the slot index within a radio frame, X is the virtual cell ID, and $n_{SCID}$ is the scrambling ID which could be indicated by DCI format 2B or 2C. However, in order to satisfy all the aforementioned requirements and saving signalling overhead, there could be two ways to select the slot number $n_s$.

The first method is based on a semi-static selection of $n_s$ for DL DMRS by an eNB, and the selection is informed to UEs via RRC signals regardless of the virtual cell ID X and the additional bit in DCI for dynamic selection of the scrambling sequence of DL DMRS by selecting $$n_s = n_s^{common} \quad (5)$$

where $n_s^{common}$ is a common slot number for the cooperating set, which can be the slot number of the associated macro cell for heterogeneous networks such as CoMP scenarios 3 and 4 for example, that is, $n_s^{common} = n_s^{Macro}$, or the cell/TP with smallest cell ID within the cooperating set for homogeneous networks, such as CoMP scenarios 1 and 2 for example, that is, $n_s^{common} = n_s^{TPIDmin}$. The semi-static selection means that the eNB would select the $n_s$ after every predetermined period.

The second method is that the slot number $n_s$ is dynamically selected by eNB and tied to the virtual cell ID X and informed to UEs via the DL control signaling such as the DCI format, and the slot number $n_s$ would be dynamically selected according to:

$$n_s = \begin{cases} n_s(0) = n_s^{serving} & X = x(0) = N_{ID}^{serving} \\ n_s(1) = n_s^{common} & X = x(1) = N_{ID}^{common} \end{cases} \quad (6)$$

where X can be dynamically selected from $x(0) = N_{ID}^{serving}$ and $x(1) = N_{ID}^{common}$. Dynamic selection means that the eNB would dynamically select the slot number $n_s$ on a subframe by subframe basis.

Recall that the schemes as described previously for dynamic selection of x(n), n=0, 1, can be Solution 1 which proposes that X is dynamic selection and tied to $n_{SCID}$ and, and Solution 2 which proposes that X is dynamic selection with additional new bits in DCI. The second method is compatible with both Solution 1 and Solution 2 as previously discussed. FIG. 10A summarizes the enhancements in generating the sequence initialization of the DL DMRS with respect to the $n_{SCID}$, x(n) and $n_s$ for Solutions 1. FIG. 10A contains a column $n_s$ 201 and takes the slot number $n_s$ into account when determining the RS sequence initialization, and notice that the slot number $n_s$ is tied to X such that when n=0, X=x(0), and $n_s$ would equal to serving 202, and when n=1, X=x(1), and $n_s$ would equal to $n_s^{common}$ 203. Similarly FIG. 10B summarizes the enhancements in generating the sequence initialization of the DL DMRS with respect to the $n_{SCID}$, x(n) and $n_s$ for Solutions 2. In the $n_s$ column 211, when $n_{SCID}=0$, the $n_s(0)$ is tied to $x(0)=N_{ID}^{serving}$ and equals to $n_s^{serving}$ 212, and when n=1, the $n_s(1)$ is tied to $x(1)=N_{ID}^{common}$ and equals to $n_s^{common}$ 213. Similarly, when $n_{SCID}=1$, the same pattern applies for $n_s(0)$ 214 and $n_s(1)$ 215.

In another embodiment, when deteimining the RS sequence initialization, the slot number $n_s$ could be dynamically selected and tied to the PDSCH scrambling ID $n_{SCID}$ according to:

$$n_s = \begin{cases} n_s^{serving} & n_{SCID} = 0 \\ n_s^{common} & n_{SCID} = 1 \end{cases} \quad (7)$$

where $n_s^{serving}$ is the slot number of serving cell and $n_s^{common}$ is a common slot number used for aligning with neighboring cells such that when $n_{SCID}=0$, $n_s$ would equal to $n_s^{serving}$ 202, and when $n_{SCID}=1$, $n_s$ would equal to $n_s^{common}$.

As the result, no additional dynamic signaling overhead would be needed for the method 2. On the other hand, method 2 also would not conflict with the generation of the scrambling sequence initialization of CSI-RS for Rel-10 UEs in pico cells in Scenario 3 when shared signaling of $n_s$ for both the CSI-RS and DL DMRS is used. This method is provided to avoid the loss of orthogonality between the co-scheduled UEs for MU-MIMO in CoMP Scenario 3 when the subframe shifting/offset is applied.

However, as indicated in (6) and (7), the slot number of serving cell/point for generating the sequence initialization of DL DMRS needs a slot offset $\Delta n_s$ to adjust to a common slot number $n_s^{common}$ and the value of $\Delta n_s$ can be configured by UE-specific semi-static higher layer signaling such as through the radio control (RRC) signaling when $X=N_{ID}^{common}$. The shifting of the slot number could be implemented by using a codebook. As described above, the value of slot number $n_s$ of each cell/point of the cooperating set for CoMP should be dynamically configured by eNB and informed to UE, and $n_s$ of the serving cell/point for generating the sequence initialization of DL DMRS should be equal to $n_s^{common}$ if $X=N_{ID}^{common}$.

There could be two types of codebooks used for signaling $n_s$ to UE if $X=N_{ID}^{common}$. The first one is a base codebook, in which each entry of the base codebook represents an absolute value of $n_s$ and can be directly used by the serving cell/point. The second one is a differential codebook, in which each entry of the differential codebook represents a relative value of $n_s$ used by the serving cell/point w.r.t. a reference cell/point (e.g. a macro cell/point). The value for dynamic selection of slot number $n_s$ within a radio frame can then derived as follows:

$$n_s = \begin{cases} (n_s^{serving} + \Delta) \mod 20 & \text{for base codebook} \\ n_s^{serving} + \Delta & \text{for differential codebook} \end{cases} \quad (8)$$

where $n_s^{serving}$ is slot number of serving cell/point and $\Delta$ is a shift value such that $n_s=n_s^{common}$, which can be designed in a codebook form. There are a number of schemes for designing the codebook of $\Delta$. Each of the values in the codebook of $\Delta$ (or "$\Delta n_s$" hereinafter) can then be configured by UE-specific RRC (semi-static) signaling.

The actual embodiment could include the following five schemes, and one of which is proposed by the present disclosure. The first scheme is to use a base codebook in which $\Delta=\Delta n_s=[0:19]$. That is to say the codebook contains a matrix of 20 slot index values in absolute form, and the index of the matrix has to be represented by 5 bits. The second scheme is to use a base codebook based on shifting of the subframe, and the codebook is based on $\Delta=2\Delta n_s$, $\Delta n_s=[0:9]$ which only needed to be represented by a four bit matrix index value. The third scheme is a differential codebook in which $\Delta=\Delta n_s=[-9:10]$. For this codebook, the matrix index has to be represented by a five bit value. The fourth scheme is a differential codebook based on subframe shifting. For this codebook, $\Delta=2\Delta n_s$, $\Delta n_s=[-4:5]$, and the matrix index has to be represented by a four bit value.

The present disclosure proposed a codebook which implements a subframe shifting according to $$\Delta=2\Delta n_s, \Delta n_s=[-3,-2,2,3] \quad (9)$$

which is based on access procedure information. The $\Delta n_s$ can be configured by UE-specific semi-static higher layer such as RRC signaling. The matrix index of this codebook only requires a two bit signaling overhead. The codebook of slot number is designed by taking the access procedure information such as the physical location of paging message, primary synchronization signal (PSS), secondary synchronization signal (SSS), and physical broadcasting channel (PBCH) into account, and the signaling overhead for transmission of slot number information can thus be further reduced. The derivation of this codebook will be explained as follows.

For frequency division duplexing (FDD), the paging message will be transmitted only on subframes 0, 4, 5, and 9, PSS/SSS on subframes 0 and 5, and PBCH on subframe 0. Therefore, the union set for the transmission of the access procedure information which includes paging, PSS/SSS and PBCH would only contains subframes 0, 4, 5 and 9. The transmit power at macro cell/point, in general, is higher than that of the pico cell/point or the remote radio header RRH in HeNet such as CoMP Scenario 3 so that the macro cell/point may interfere with the pico cell/point. In order to avoid the collision of access procedure information on pico cell/point from macro cell/point, an almost blank subframe (ABS) and a subframe shifting scheme are used in CoMP Scenarios 3. However, an arbitrary subframe shifting values may not be suitable but only by performing the subframe shifting such that the access procedure information of pico cell/point is not transmitted on the union set of the access procedure information of macro cell/point.

Figure 11A:
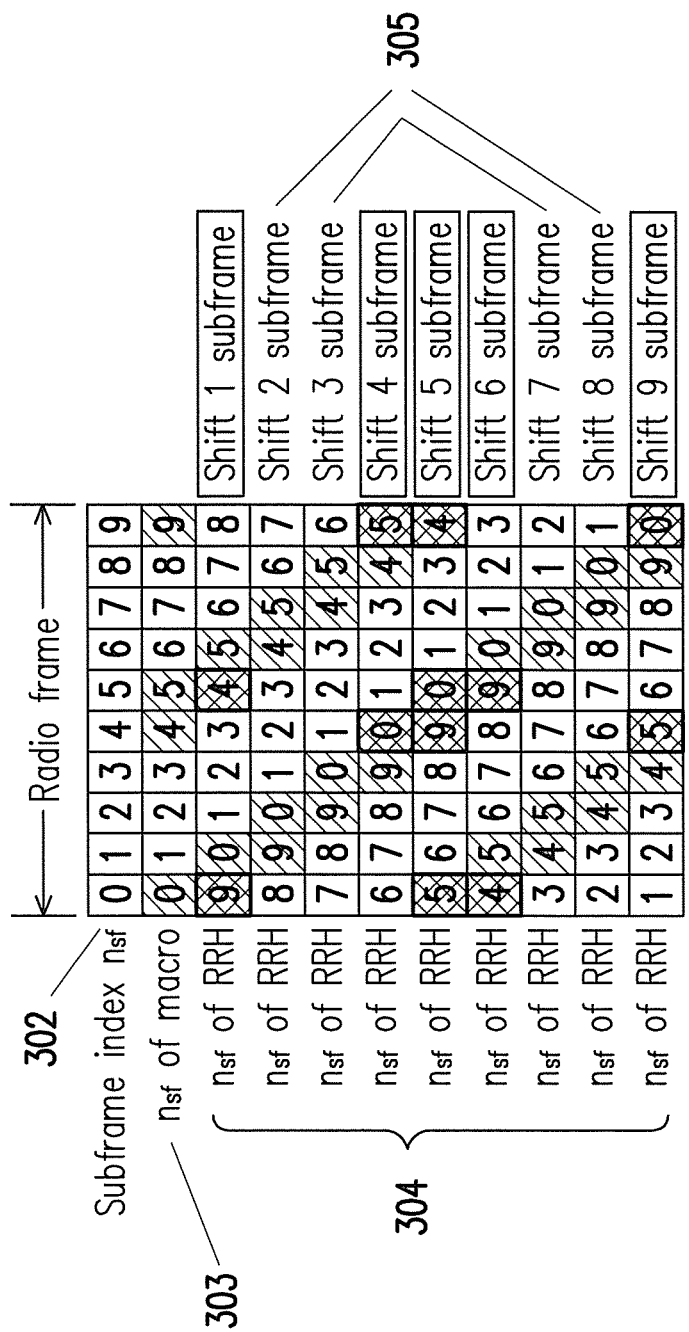
FIG. 11A illustrates allowable subframe shifting values for FDD in accordance with one of the exemplary embodiments of the present disclosure.

FIG. 11A illustrates allowable subframe shifting values for FDD. Assuming that a radio frame contains 10 subframes 302 indexed from 0 to 9, the shifting of the subframe index relative to the index of the macro cell 303 may include from 1 subframe to 9 subframes 304. However, the allowable shifting of the subframe index 305 may only occur for 2, 3, 7, and 8 subframes as shifting by 1, 4, 5, 6, and 9 subframes are not allowed.

Figure 11B:
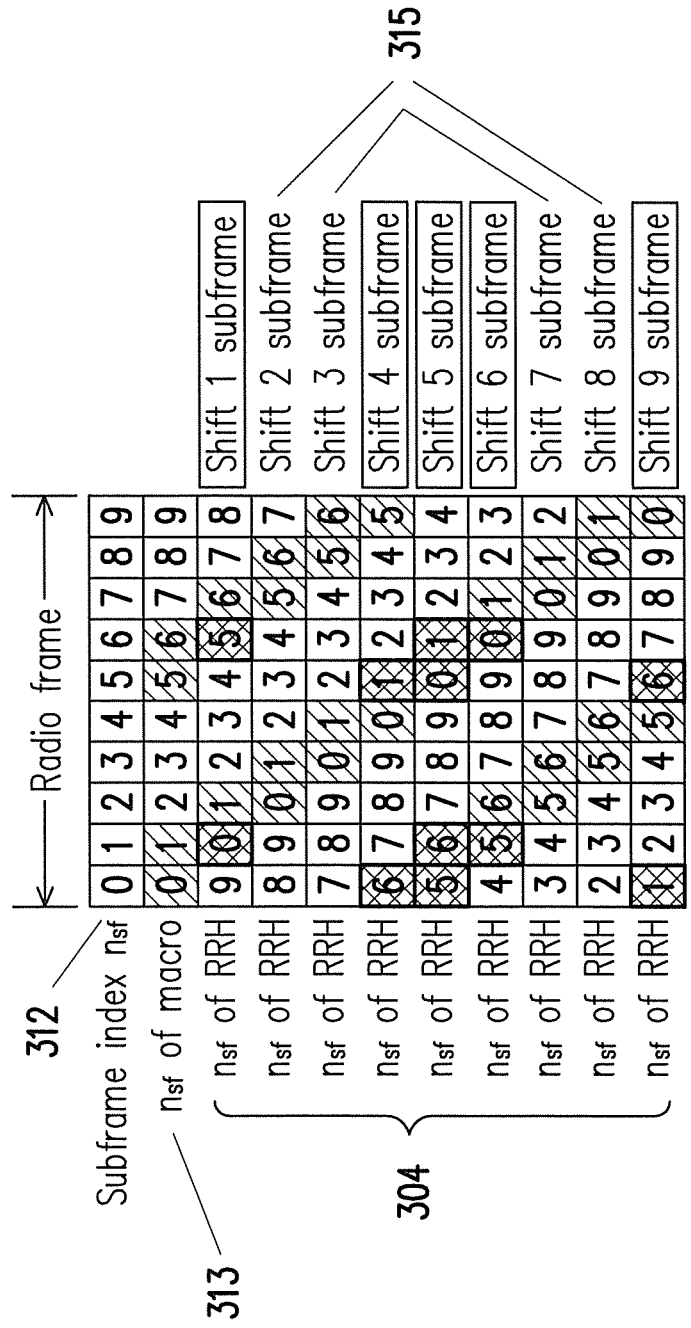
FIG. 11B illustrates allowable subframe shifting values for TDD in accordance with one of the exemplary embodiments of the present disclosure.

For time domain duplexing (TDD) on the other hand, the paging message will be transmitted only on subframes 0, 1, 5, and 6, PSS on subframes 1 and 6, SSS on subframes 0 and 5, and PBCH on subframe 0. Therefore, the union set for the transmission of the access procedure information including paging, PSS/SSS, and PBCH contains subframes 0, 1, 5 and 6. FIG. 11B illustrates allowable subframe shifting values for TDD. Assuming that a radio frame contains 10 subframes 312 indexed from 0 to 9, the shifting of the subframe index relative to the index of the macro cell 313 may include from 1 subframe to 9 subframes 314. However, the allowable shifting of the subframe index 315 may only occur for 2, 3, 7, and 8 subframes as shifting by 1, 4, 5, 6, and 9 subframes are not allowed. Since it has been known that only the shifting 2, 3, 7 and 8 subframes are allowed, a 2-bit codebook for the slot number indication as given in equation (10) is thus suggested to reduce the signaling overhead when subframe shifting is considered in CoMP Scenario 3.

Figure 12A:
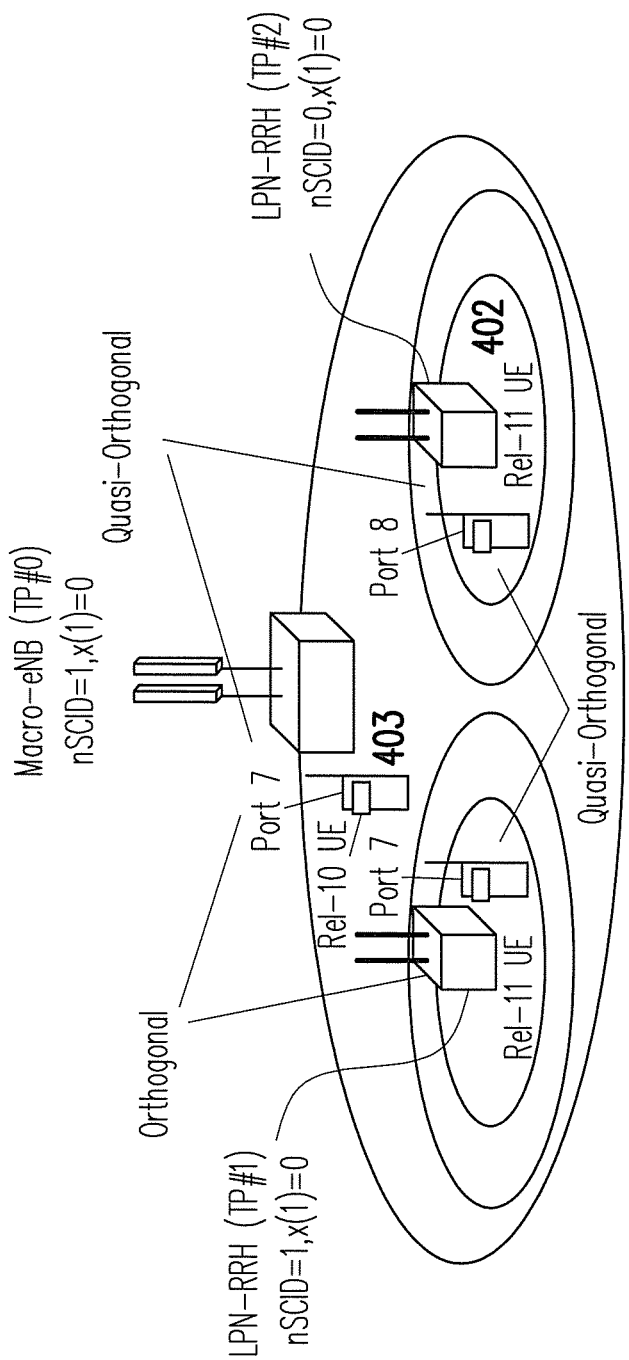
FIG. 12A-12B respectively illustrates performance degradation in requirement (3) and requirement (4) of DL DMRS enhancement.

Next, the enhancement of orthogonal MU pairs for DL DMRS will be considered. When the size of CoMP cooperating set is 3, it is observed that the performance may be limited in Requirement (3) of DL DMRS enhancement if only 2 DL DMRS ports are considered for both the solutions of dynamic selection of X since at most 2 DMRS ports can be allowed for 3 Rel-10 and Rel-11 co-scheduled UEs performing the MU-MIMO. Recall that requirement (3) requires orthogonal MU pairing between releases. As illustrated by FIG. 12A, the orthogonality among the 3 co-scheduled UEs performing the MU-MIMO is therefore poor as a release 10 UE 403 would not be orthogonal with a release 11 UE 402.

Figure 12B:
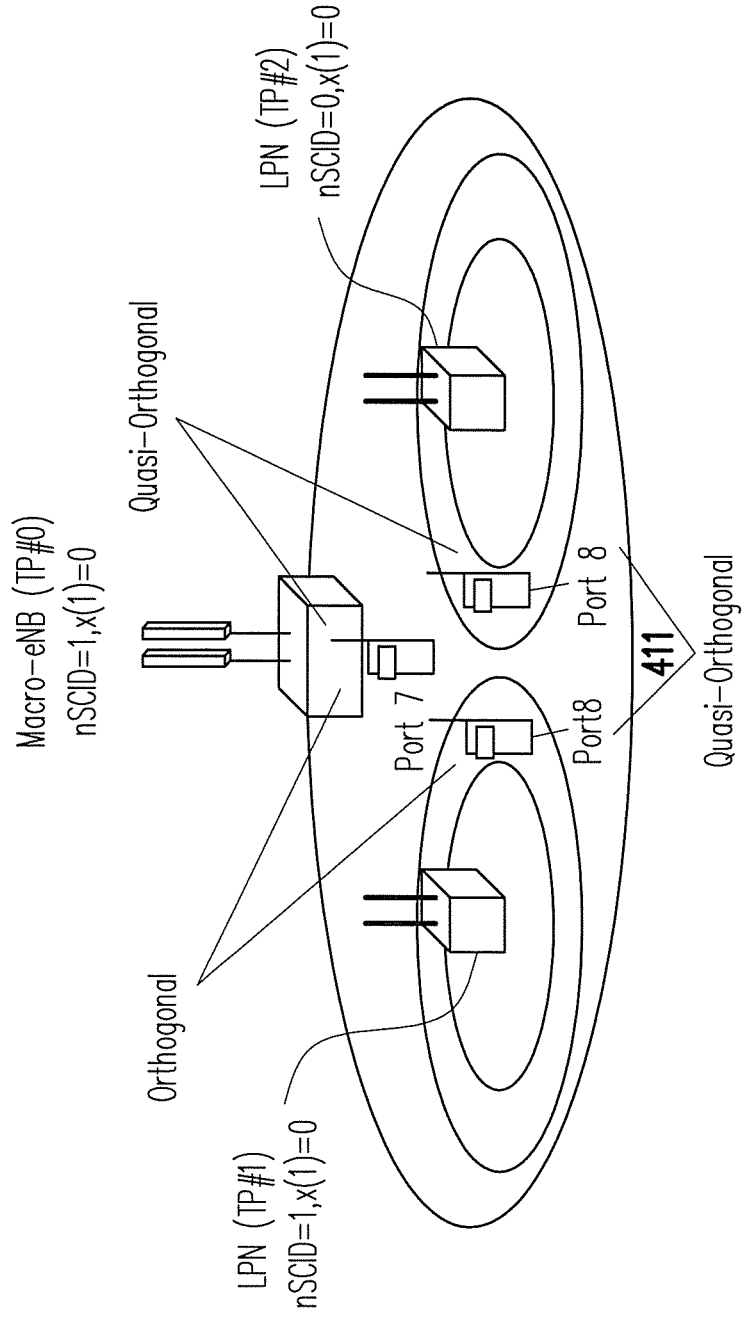

On the other hand, when the size of CoMP cooperating set is 3, it is also observed that the performance may be degraded in Requirement 4 of DL DMRS enhancement if only 2 DL DMRS ports are considered for both the solutions for dynamic selection of X. This is because that the precoding scheme will perform poor in this case due to loss of capability of spatial separation by precoding between the co-scheduled UEs when the co-scheduled UEs are located at TP border, as shown in FIG. 12B. Recall that requirement (4) requires orthogonal MU pairing across TP border. Notice that at the TP border 411, the orthogonality could not be maintained.

Figure 12C:
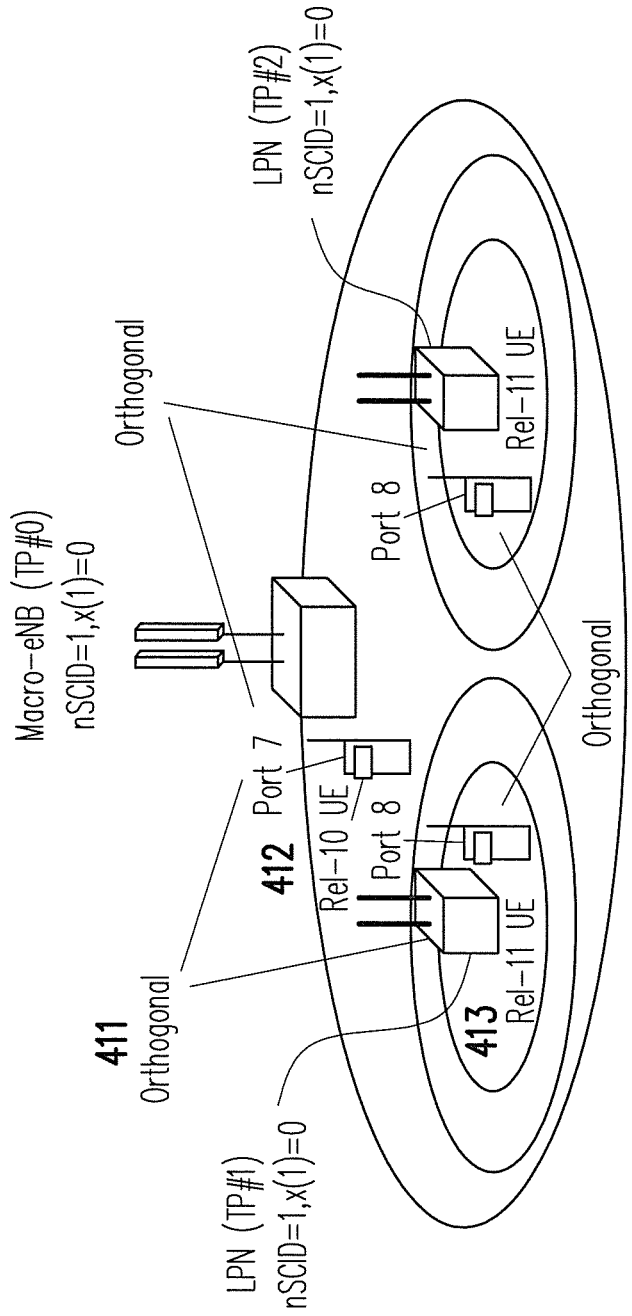
FIG. 12C-12D respectively illustrates an improvement over the performance degradation in requirement (3) and requirement (4) of DL DMRS enhancement.
Figure 12D:
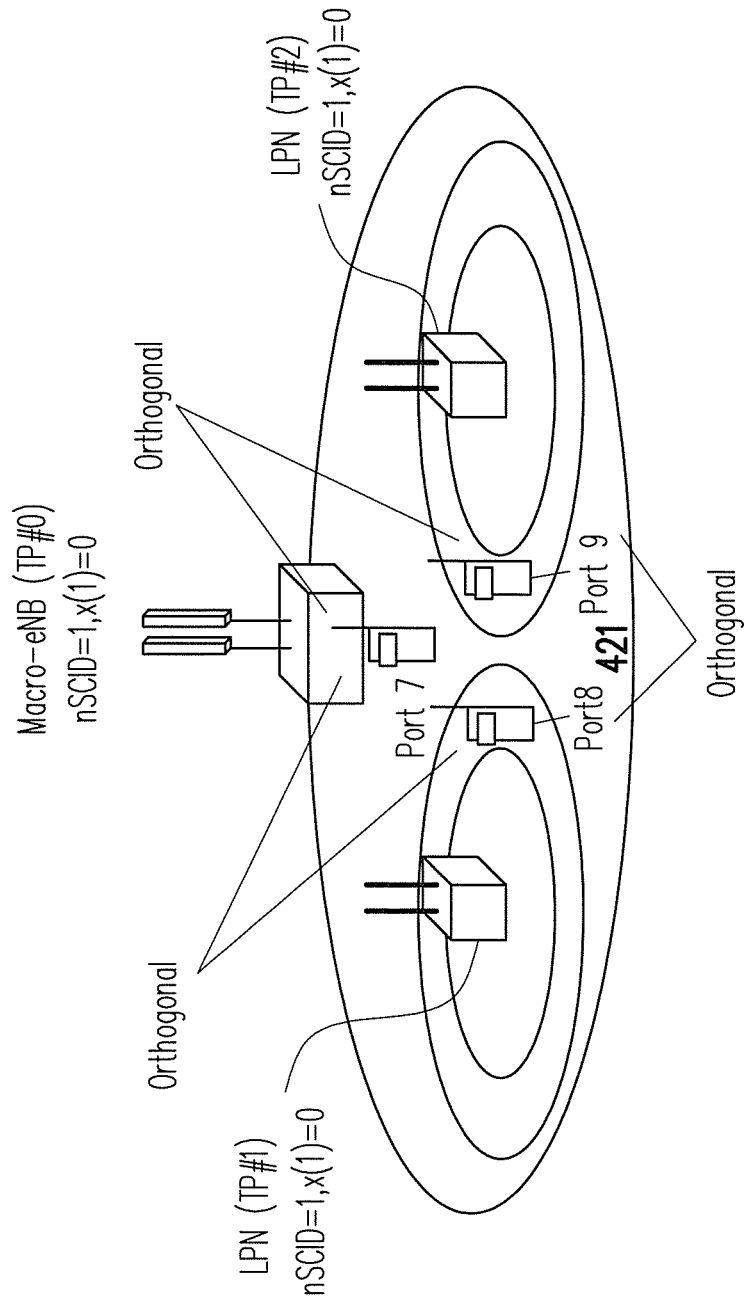

Based on the observations, it is thus suggested that at most 3 DL DMRS ports (antenna ports 7~9) should be supported to further enhance the performance for MU-MIMO and CoMP if the maximum size of measurement set for CoMP is 3. An improvement over FIGS. 12A and 12B is illustrated in FIG. 12C for requirement (3) and FIG. 12D for requirement (4). In FIGS. 12C and 12D, $n_s=n_s(1)$, $X=x(1)$, and $n_{SCID}=1$ are used for generating the DL DMRS sequence initialization so that the three co-scheduled users can achieve the DL orthogonality by using a unique one of the DL DMRS ports for the co-scheduled users, each of which with a single layer and a single codeword. In FIG. 12C, notice that requirement (3) in satisfied when the release 10 UE 412 and the release 11 UE 413 are orthogonal 411 to each other. In FIG. 12D, notice that requirement (4) is satisfied when the orthogonal MU pairing occurs across the TP border 421.

Based on the aforementioned disclosure, Table 3 can then be modified accordingly as FIG. 13. The modified table in FIG. 13 assumes that $n_s(0)=n_s^{serving}$, $n_s(1)=n_s^{common}$, $x(0)=n_{ID}^{serving}$, and $x(1)=n_{ID}^{common}$, and it can be seen that rank 3 MU join transmission with one layer per port in each cell/point can be achieved without any additional signal overhead and standard impacts. In the table of FIG. 13 under a single codeword value 7 401, a unique port, port 9, is used as a DL DMRS port for the co-scheduled users, each of which transmits with a single layer and a single codeword using the parameter $n_s=n_s(1)$, $X=x(1)$, and $n_{SCID}=1$ for DL DMRS scrambling sequence initialization.

Figure 14:
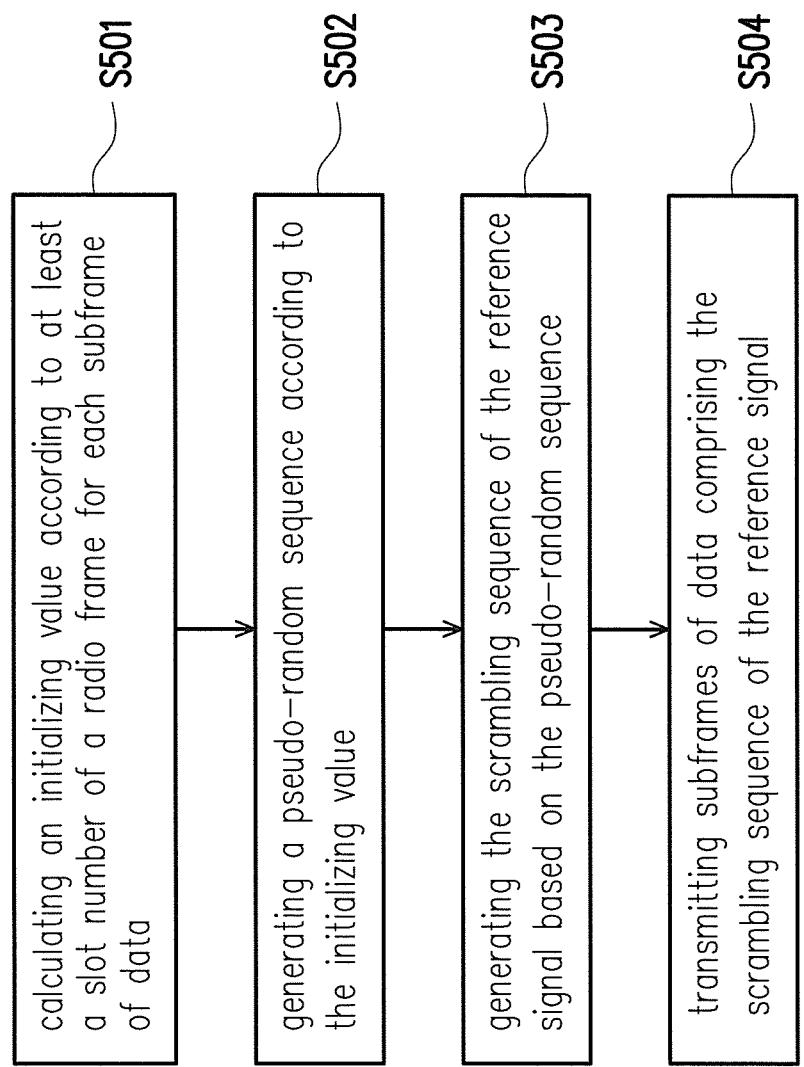
FIG. 14 illustrates the overall method of initializing a scrambling sequence of a reference signal in accordance with one of the exemplary embodiments of the present disclosure.

FIG. 14 illustrates the overall method for initializing a scrambling sequence of a DL-DMRS reference signal to be used by a base station in accordance with one of the exemplary embodiments of the present disclosure. It should be noted that the method could be implemented by a macro eNodeB (eNB) such as a macro base station, and the method could also be implemented by a LPN/RRH or a pico cell base station. In step S501, the base station calculates an initializing value according to at least a slot index of a radio frame for each subframe of data. In step S502, a pseudo-random sequence according to the initializing value is generated. In step S503, the scrambling sequence of the reference signal based on the pseudo-random sequence is generated. In step S504, the base station transmits data which includes the scrambling sequence of the reference signal.

It should be noted that in step S501, the scrambling sequence of DL DMRS for PDSCH on ports 7-14 could be initialized by:

$$c_{init}=((n_s/2)+1)\cdot(2\cdot X+1)\cdot 2^{16}+n_{SCID}$$

where $n_{SCID}$, X and $n_s$ are scrambling ID, virtual cell ID and slot number of a cell/point, with $n_s$ being a parameter whose value is dynamic selection from $n_s(0)$ and $n_s(1)$, and $n_s(n)$, n=0, 1, are configured by UE-specific semi-static signaling.

The slot number $n_s$ could be dynamically selected and tied to the parameter X which could be the virtual cell ID according to:

$$n_s = \begin{cases} n_s^{serving} & X = x(0) \\ n_s^{common} & X = x(1) \end{cases}$$

where $n_s^{serving}$ where is the slot number of serving cell and $n_s^{common}$ is a common slot number used for aligning with neighboring cells. $x(0)=N_{ID}^{serving}$ and $x(1)=N_{ID}^{common}$, where $N_{ID}^{serving}$ is the cell ID of serving cell and $N_{ID}^{common}$ is a common cell ID, which can be set as $N_{ID}^{common}=N_{ID}^{Macro}$. Dynamic selection means a selection on a subframe by subframe basis.

The slot number $n_s$ could be dynamically selected and tied to the PDSCH scrambling ID $n_{SCID}$ according to:

$$n_s = \begin{cases} n_s^{serving} & n_{SCID} = 0 \\ n_s^{common} & n_{SCID} = 1 \end{cases}$$

where $n_s^{serving}$ is the slot number of serving cell and $n_s^{common}$ is a common slot number used for aligning with neighboring cells.

Slot number $n_s$ can be derived as $n_s n_s^{serving}+\Delta n_s$ where $n_s^{serving}$ is slot number of serving cell and $\Delta n_s=[-3, -2, 2, 3]$ is a slot offset used to adjust $n_s$ such that $n_s$ can match to $n_s^{common}$ (i.e. $n_s=n_s^{common}$) when $X=N_{ID}^{common}$, which can be obtained according to the physical location of paging message, PSS/SSS and PBCH, and configured by UE-specific semi-static higher layer (i.e. RRC) signaling.

At most 3 DL DMRS ports (antenna ports 7~9) for MU-MIMO and CoMP are supported if the maximum size of CoMP measurement set is 3. Assuming that $n_s(0)=n_s^{serving}$, $n_s(1)=n_s^{common}$, $x(0)=N_{ID}^{serving}$ and $x(1)=N_{ID}^{common}$ as suggest by FIG. 13.

In view of the aforementioned descriptions, the present disclosure is able to reduce reference signaling overhead by proposing that the initialization of scrambling sequence of DL DMRS is jointly designed with that of channel state information RS CSI-RS. By taking the slot index into account for scrambling sequence initialization, various CoMP requirements for future releases could be satisfied without using extra overhead and without making impacts for current standards.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for initializing a scrambling sequence of a reference signal, for use by a base station to transmit subframes of data, and the method comprising:
    calculating an initializing value according to at least a slot index of a radio frame for each subframe of data, wherein the slot index is determined based on a virtual cell identification (ID);
    generating a pseudo-random sequence according to the initializing value;
    generating the scrambling sequence of the reference signal based on the pseudo-random sequence; and
    transmitting subframes of data comprising the scrambling sequence of the reference signal, wherein the virtual cell ID is dynamically configured by the base station upon the initialization of the pseudo-random sequence for a cell served by the base station.

2. The method of claim 1, wherein the reference signal is downlink (DL) modulation reference signal (DMRS).

3. The method of claim 2, wherein the wherein the determination of the slot index is tied to a physical downlink shared channel (PDSCH) scrambling ID.

4. The method of claim 3, wherein the determination of the slot index is dynamically chosen from among a first slot index candidate and a second slot index candidate, wherein the determination of the slot index is tied to the PDSCH scrambling ID which comprises a first scrambling ID candidate and a second scrambling ID candidate.

5. The method of claim 4, wherein the first slot index candidate and the second slot index candidate are configured by a user equipment (UE) specific semi-static higher layer signaling.

6. The method of claim 4, wherein the determination of the slot index is tied to the PDSCH scrambling ID such that selecting the first slot index candidate means selecting the first PDSCH scrambling ID candidate, and selecting the second slot index candidate means selecting the second PDSCH scrambling ID candidate.

7. The method of claim 6, wherein the first slot index candidate is the slot index of the serving cell, and the second slot index candidate is a virtual common slot index used for aligning with neighbor cells.

8. The method of claim 1, wherein the determination of the slot index is dynamically chosen from among a first slot index candidate and a second slot index candidate, wherein the determination of the slot index is tied to the virtual cell ID which comprises a first virtual cell ID candidate and a second virtual cell ID candidate.

9. The method of claim 8, wherein the first slot index candidate and the second slot index candidate are configured by a user equipment (UE) specific semi-static higher layer signaling.

10. The method of claim 9, wherein the first slot index candidate is the slot index of the serving cell, and the second slot index candidate is a virtual common slot index used for aligning with neighbor cells.

11. The method of claim 8, wherein the determination of the slot index is tied to the virtual cell ID such that selecting the first slot index candidate means selecting the first virtual cell ID candidate, and selecting the second slot index candidate means selecting the second virtual cell ID candidate.

12. The method of claim 1, wherein the slot index is obtained from a slot index of a serving cell and a slot offset represented by two bits.

13. The method of claim 12, wherein the slot index is determined according to the slot index of a serving cell plus 2 times the slot offset, wherein the slot offset is presented by [−3, −2, 2, 3].

14. The method of claim 13, wherein the slot offset is obtained according a physical location of a paging channel, a primary synchronization signal or a second synchronization signal, and a physical broadcast channel, and the slot offset is configured through a radio resource control (RRC) signal.

15. The method of claim 1, wherein the element of calculating the initializing value according to at least a slot index of the radio frame comprising:
generating the initializing value according to $c_{init} = ((n_s/2)+1) \cdot (2 \cdot X+1) \cdot 2^{16} + n_{SCID}$, wherein $n_{SCID}$ is a scrambling identification (ID), X is the virtual cell ID, and $n_s$ is the slot index of the radio frame.

16. The method of claim 15, wherein the reference signal is transmitted through physical downlink shared channel (PDSCH) over antenna ports 7 to 14 as defined by a version of the long term evolution (LTE) specification.

17. The method of claim 16, wherein when the base station forms a coordinated multi-point (CoMP) with two other base stations or less, antenna port 9 is used to support three co-scheduled users with each user transmitting with a single data layer and a single codeword.

18. The method of claim 17, wherein, the $c_{init}$ is generated according to $n_s = n_s(1)$, $X = x(1)$, and $n_{SCID} = 1$.

19. A base station comprising a transmitter, a receiver, and a processing circuit coupled to the transmitter and the receiver, and the processing circuit is configured through the transmitter and the receiver for:
calculating an initializing value according to at least a slot index of a radio frame for each subframe of data, wherein the slot index is determined based on a virtual cell identification (ID);
generating a pseudo-random sequence according to the initializing value;
generating a scrambling sequence of a reference signal based on the pseudo-random sequence; and
transmitting subframes of data comprising the scrambling sequence of the reference signal, wherein the virtual cell ID is dynamically configured by the processing circuit upon the initialization of the pseudo-random sequence for a cell served by the base station.

20. The base station of claim 19, wherein the reference signal is downlink (DL) modulation reference signal (DMRS).

21. The base station of claim 20, wherein the wherein the determination of the slot index is tied to a physical downlink shared channel (PDSCH) scrambling ID.

22. The base station of claim 21, wherein the determination of the slot index is dynamically chosen from among a first slot index candidate and a second slot index candidate, wherein the determination of the slot index is tied to the PDSCH scrambling ID which comprises a first scrambling ID candidate and a second scrambling ID candidate.

23. The base station of claim 22, wherein the determination of the first slot index candidate and the second slot index candidate are configured by a user equipment (UE) specific semi-static higher layer signaling.

24. The base station of claim 23, wherein the determination of the slot index is tied to the PDSCH scrambling ID such that selecting the first slot index candidate means selecting the first PDSCH scrambling ID candidate, and selecting the second slot index candidate means selecting the second PDSCH scrambling ID candidate.

25. The base station of claim 24, wherein the first slot index candidate is the slot index of the serving cell, and the second slot index candidate is a virtual common slot index used for aligning with neighbor cells.

26. The base station of claim 19, wherein the determination of the slot index by the processing circuit is dynamically chosen from among a first slot index candidate and a second slot index candidate, wherein the determination of the slot index is tied to the virtual cell ID which comprises a first virtual cell ID candidate and a second virtual cell ID candidate.

27. The base station of claim 26, wherein the first slot index candidate and the second slot index candidate are configured by a user equipment (UE) specific semi-static higher layer signaling.

28. The base station of claim 26, wherein the determination of the slot index by the processing circuit is tied to the virtual cell ID such that selecting the first slot index candidate means selecting the first virtual cell ID candidate, and selecting the second slot index candidate means selecting the second virtual cell ID candidate.

29. The base station of claim 28, wherein the first slot index candidate is the slot index of the serving cell, and the second slot index candidate is a virtual common slot index used for aligning with neighbor cells.

30. The base station of claim 19, wherein the slot index is obtained by the processing circuit from a slot index of a serving cell and a slot offset represented by two bits.

31. The base station of claim 30, wherein the slot index is determined by the processing circuit according to the slot index of a serving cell plus 2 times the slot offset, wherein the slot offset is presented by a precoding matrix [−3, −2, 2, 3].

32. The base station of claim 31, wherein the slot offset is obtained by the processing circuit according a physical location of a paging channel, a primary synchronization signal or a second synchronization signal, and a physical broadcast channel, and the slot offset is configured through a radio resource control (RRC) signal.

33. The base station of claim 19, wherein the processing circuit configured for calculating the initializing value according to at least a slot index of the radio frame comprising:

generating the initializing value according to $c_{init} = ((n_s/2)+1) \cdot (2 \cdot X+1) \cdot 2^{16} + n_{SCID}$, wherein $n_{SCID}$ is a scrambling identification (ID), X is the virtual cell ID, and $n_s$ is the slot index of the radio frame.

34. The base station of claim 33, wherein the reference signal is transmitted by the transmitter through physical downlink shared channel (PDSCH) over antenna ports 7 to 14 as defined by a version of the long term evolution (LTE) specification.

35. The base station of claim 34, wherein when the base station forms a coordinated multi-point (CoMP) with two other base stations or less, antenna port 9 is used to support three co-scheduled users with each user transmitting with a single data layer and a single codeword.

36. The base station of claim 35, wherein, the $c_{init}$ is generated according to $n_s = n_s(1)$, $X = x(1)$, and $n_{SCID} = 1$.

37. The base station of claim 35, wherein any one of the base station and the two other base stations is either a macro cell base station or a pico cell base station.

* * * * *